United States Patent [19]
Mercer et al.

[11] Patent Number: 5,269,631
[45] Date of Patent: Dec. 14, 1993

[54] PLASTICS MATERIAL MESH STRUCTURES

[75] Inventors: Frank B. Mercer, Blackburn; Keith F. Martin, Wiswell; Thomas K. Gardner, Blackburn, all of Great Britain

[73] Assignee: Netlon Limited, Blackburn, England

[21] Appl. No.: 954,045

[22] Filed: Sep. 30, 1992

Related U.S. Application Data

[63] Continuation-in-part of Ser. No. 852,074, Mar. 12, 1992, abandoned, which is a continuation-in-part of Ser. No. 798,845, Nov. 25, 1991, which is a continuation of Ser. No. 582,052, Sep. 14, 1990.

[30] Foreign Application Priority Data

Sep. 14, 1989 [GB] United Kingdom ............... 8920843
May 24, 1991 [GB] United Kingdom ............... 9111304
Mar. 9, 1992 [GB] United Kingdom ............... 9205112
May 20, 1992 [AU] Australia ............................. 17030/92
May 22, 1992 [GB] United Kingdom ............... 9211032

[51] Int. Cl.$^5$ ...................... E02D 17/20; B29C 49/08; B32B 5/12
[52] U.S. Cl. .................................. 405/258; 264/288.4; 405/284; 428/229
[58] Field of Search ................... 405/15, 16, 19, 258, 405/284; 264/288.4, 291, DIG. 3; 428/224, 225, 226, 229, 231

[56] References Cited

U.S. PATENT DOCUMENTS 3,252,181  5/1966  Hureau .
3,386,876  6/1968  Wyckoff .
3,441,638  4/1969  Patchell et al. .
3,554,853  1/1971  Mercer et al. .

(List continued on next page.)

FOREIGN PATENT DOCUMENTS 0108513  5/1984  European Pat. Off. .
0418104  3/1991  European Pat. Off. .

(List continued on next page.)

OTHER PUBLICATIONS

Book entitled "Conweb Unoriented Plastic Netting".
Brochure entitled "'Tensar' Geogrids In Civil Engineering".
Brochure entitled "Tensar — Guidelines for the design and construction of embankments over stable foundations using 'Tensar' geogrids."
Conwed Oriented Plastic Netting.
Conwed Oriented Plastic Netting Samples.
Conwed Unoriented Plastic Netting.

*Primary Examiner*—David H. Corbin
*Attorney, Agent, or Firm*—Jacobson, Price, Holman & Stern

[57] ABSTRACT

A starting material is provided having a rectangular grid of holes and the starting material is stretched in the MD to such an extent that the junctions are not significantly oriented, is stretched in the TD to such an extent that the junctions are not significantly oriented, and is finally stretched in the MD to such an extent that the junction centres thin down by at least 30% and there is significant narrowing down of the junction The resultant MD stretch is substantially greater than the resultant TD stretch. The MD strands, having thinned down and oriented to a substantial degree, cause the orientation to pass into the ends of the junctions and right through the junctions. The junctions increase in length by a ratio of at least about 2.5:1 and narrow down substantially. The ends of the junctions are not stretched more than 100% more than the centres. At each junction there is a thicker, parallel-sided, long zone which is oriented in the MD and has thinned down less than the mid-points of the MD strands so that there is continuous MD orientation running from end to end of the mesh structure. There are no dips in the junctions and the centres of the junctions are not substantially thinner than any other part of the junction on the MD centre line. There are biaxially-oriented zones on either side of the thicker zones, and oriented crotches connecting respective MD strands and TD strands, the biaxially-oriented zone merging gradually with the crotches.

35 Claims, 17 Drawing Sheets

U.S. PATENT DOCUMENTS

| | | |
|---|---|---|
| 3,666,609 | 5/1972 | Kalwaites et al. . |
| 3,851,034 | 11/1974 | Harmon et al. . |
| 3,914,365 | 10/1975 | Kim et al. . |
| 3,922,329 | 11/1975 | Kim et al. . |
| 3,954,933 | 5/1976 | Rasmussen . |
| 4,013,752 | 3/1977 | Kalwaites et al. . |
| 4,101,358 | 7/1978 | Kim et al. . |
| 4,135,021 | 1/1979 | Patchell et al. . |
| 4,152,479 | 5/1979 | Larsen . |
| 4,186,781 | 2/1980 | Kim et al. . |
| 4,374,798 | 2/1983 | Mercer . |
| 4,374,798 | 2/1983 | Mercer . |
| 4,470,942 | 9/1984 | Beretta . |
| 4,530,622 | 7/1985 | Mercer ................................ 405/258 |
| 4,536,429 | 8/1985 | Mercer . |
| 4,590,029 | 5/1986 | Mercer . |
| 4,680,215 | 7/1987 | Mercer . |
| 4,743,486 | 5/1988 | Mercer et al. . |
| 4,804,293 | 2/1989 | Varkonyi et al. ..................... 405/15 |
| 4,808,358 | 2/1989 | Beretta . |
| 4,992,003 | 2/1991 | Perach ................................ 405/258 |

FOREIGN PATENT DOCUMENTS

| | | |
|---|---|---|
| 0374365 | 6/2990 | European Pat. Off. . |
| 368393 | 11/1906 | France . |
| 2131842 | 11/1972 | France . |
| 2138198 | 1/1973 | France . |
| 2213843 | 8/1974 | France . |
| 969655 | 9/1964 | United Kingdom . |
| 1054946 | 1/1967 | United Kingdom . |
| 1075487 | 7/1967 | United Kingdom . |
| 1209523 | 10/1970 | United Kingdom . |
| 1235901 | 6/1971 | United Kingdom . |
| 1310474 | 3/1973 | United Kingdom . |
| 1340587 | 12/1973 | United Kingdom . |
| 1406642 | 9/1975 | United Kingdom . |
| 1427281 | 3/1976 | United Kingdom . |
| 1496786 | 1/1978 | United Kingdom . |
| 1548865 | 7/1979 | United Kingdom . |
| 2035191 | 6/1980 | United Kingdom . |
| 2073090 | 10/1981 | United Kingdom . |
| 2108896 | 5/1983 | United Kingdom . |
| 2124965 | 2/1984 | United Kingdom . |
| 2128132 | 4/1984 | United Kingdom . |
| 2174332 | 11/1986 | United Kingdom . |

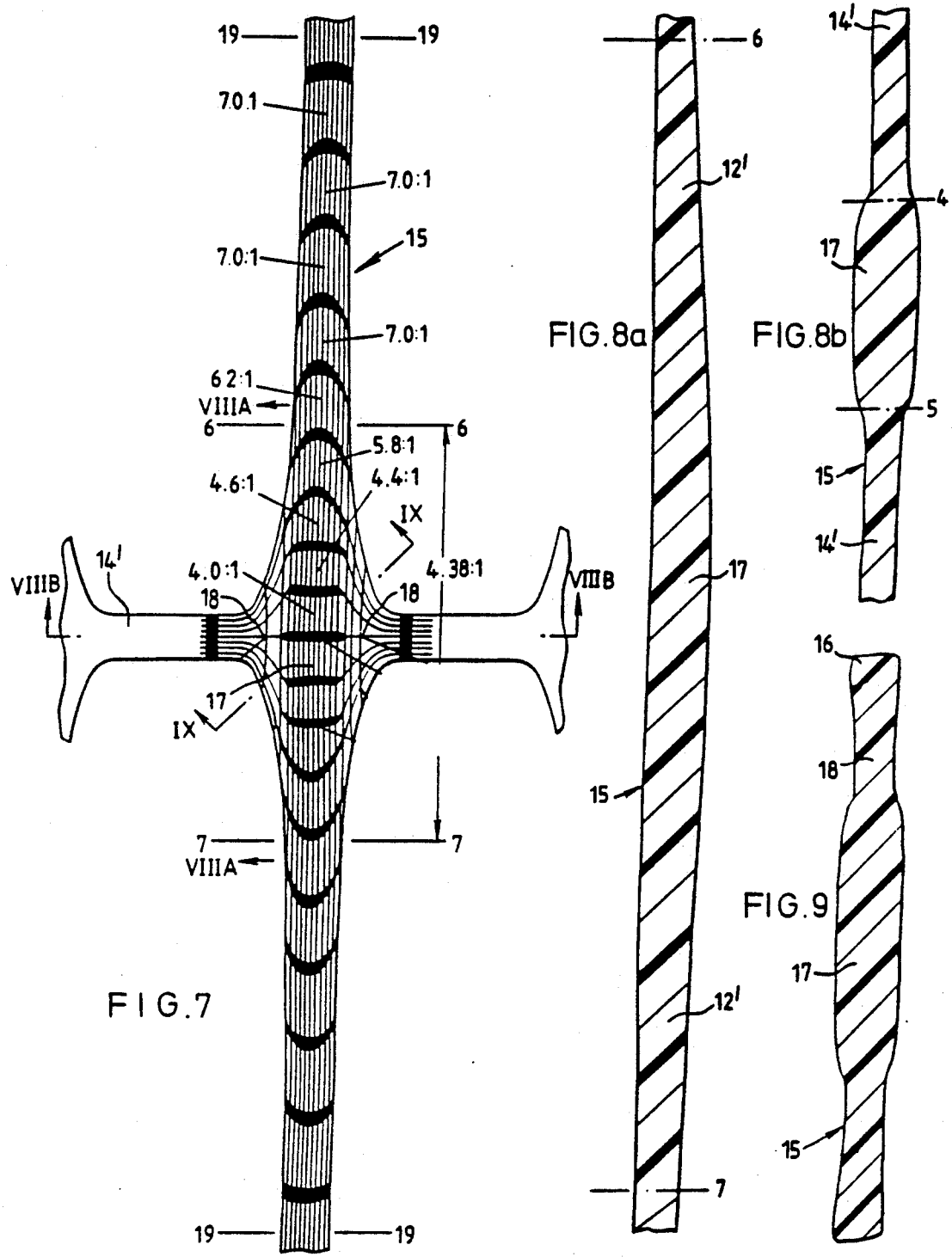

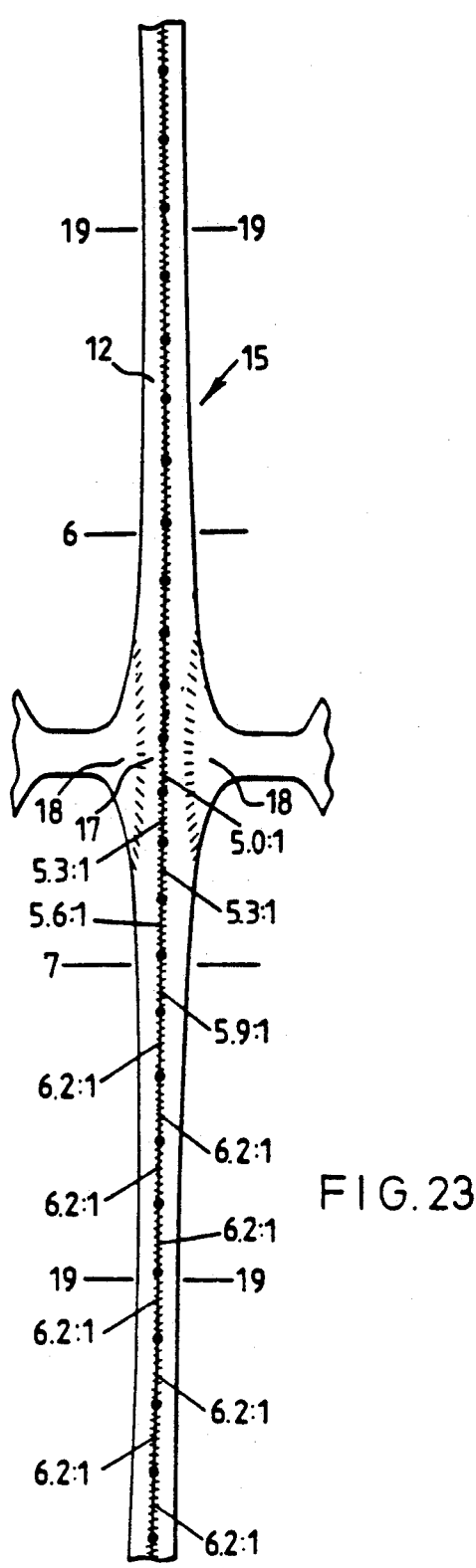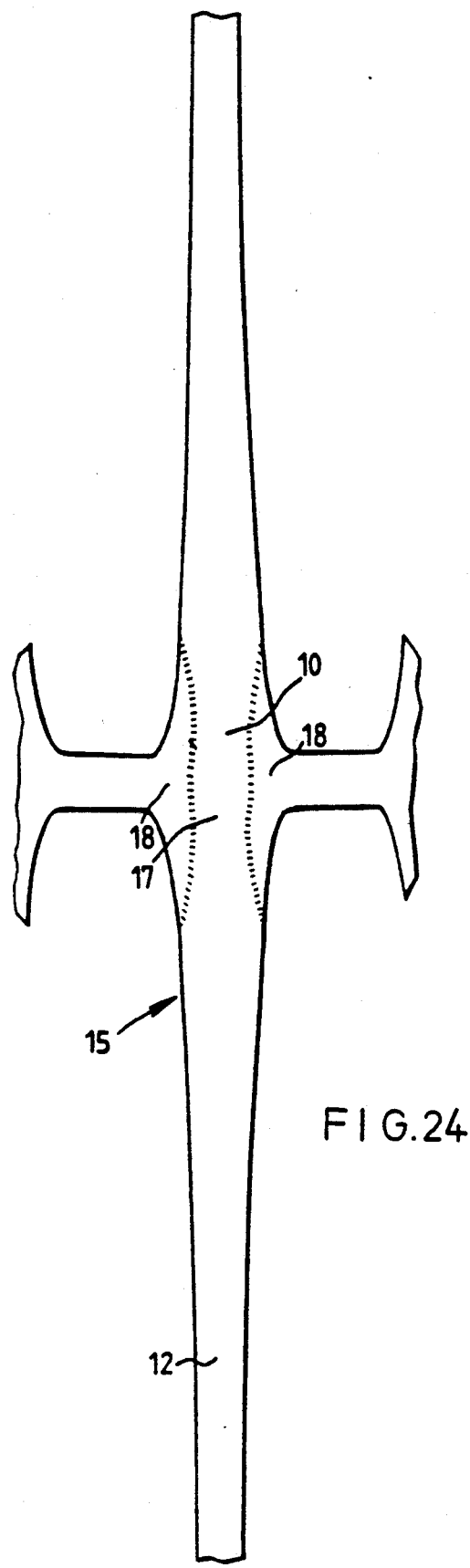
FIG. 23
FIG. 24

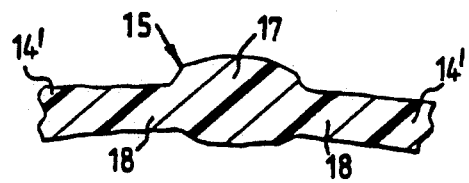
FIG. 30a
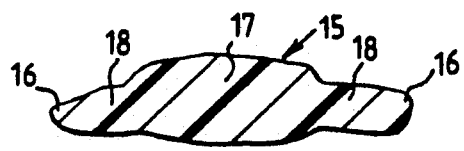
FIG. 30b
FIG. 30c
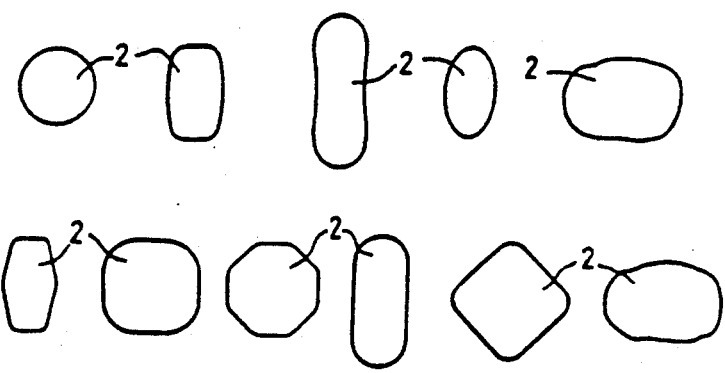
FIG. 31
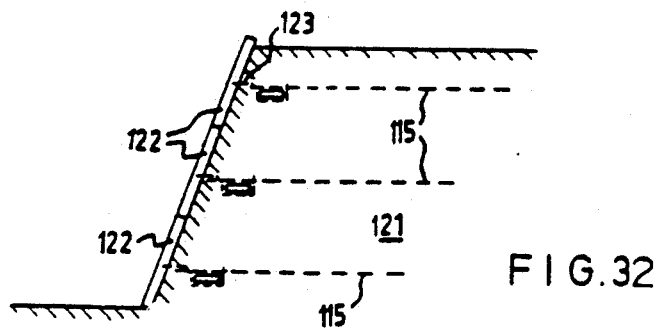
FIG. 32

PLASTICS MATERIAL MESH STRUCTURES

This application is a continuation-in-part of application Ser. No. 07/852,074 filed Mar. 12, 1992 now abandoned, which in turn is a continuation-in-part of application Ser. No. 07/798,845 filed Nov. 25, 1991, which in turn is a continuation of application Ser. No. 07/582,052 filed Sep. 14, 1990, the disclosures of which earlier applications are wholly incorporated herein by reference.

BACKGROUND OF THE INVENTION

The present invention relates to a method of producing an integral biaxially-molecularly-oriented plastics material mesh structure, of the type comprising: providing a plastics starting material having a thickness of not less than about 2 mm at its thickest point and having a pattern of holes defining strand-forming zones between respective adjacent holes, and notional junction zones between the strand-forming zones; stretching the starting material in a subsidiary direction to stretch out, thin down and orient subsidiary strand-forming zones to form subsidiary oriented strands; and stretching the material in a main direction generally at right angles to the subsidiary direction to stretch out, thin down and orient main strand-forming zones to form main oriented strands extending generally at right angles to the subsidiary strands, the stretching being continued until the thinning down extends right through the notional junction zones to aligned main strands on the other sides of the notional junction zones and extends around crotches to respective subsidiary strands so that in the crotches the orientation is in the direction running around the respective crotch, thereby forming oriented junctions with oriented crotches connecting respective main and subsidiary strands. The resultant main direction stretch is substantially greater than the resultant subsidiary direction stretch. At each junction, there is a central or thicker zone, which normally has thinned down less than the mid-points of the main strands. There are zones on either side of the central or thicker zone, which are normally thinner than the junction centre.

The present invention also relates to a biaxially-molecularly-oriented integral plastics material mesh structure of the type having a thickness of not less than about 1 mm at its thickest point, and having substantially greater strength in a main direction than in a subsidiary direction, the mesh structure comprising: main oriented strands extending in the main direction; subsidiary oriented strands extending in the subsidiary direction; and oriented junctions between respective main and subsidiary strands, respective main and subsidiary strands being interconnected by oriented crotches with the orientation in the direction running around the respective crotches, there being at each junotion a thicker zone which is substantially thicker than zones on either side thereof each on the axis of a respective subsidiary strand, and which thicker zone has a substantially greater dimension parallel to the main direction than that parallel to the subsidiary direction.

The mesh structures of the invention are for applications in which the main direction is the machine direction, and in which the main tensile force will be applied in the machine direction, and the mesh structures will have substantially greater strength in the machine direction than in the transverse direction; for instance, in a composite civil engineering structure the mesh structure can be embedded in soil and attached to a vertical wall facing, when the main tensile force will be at right angles to the facing. The main strands are those that will take the main tensile force, the transverse strands being generally at right angles to the main strands.

It is desirable to orientate as much as possible in the machine direction, but the degree of stretch that can be applied in the machine direction is limited by the risk of forming junctions which can crack or split in the machine direction on bending in the transverse direction, or of forming junctions which have marked dips in their central part. Such dips can significantly reduce the transverse direction strength of the mesh structure.

U.S. Pat. No. 4,374,798 and EP-A-0 418 104 disclose methods and mesh structures of the type referred to.

DEFINITIONS

"MD" is the machine direction and "TD" is the transverse direction. The MD is the direction longitudinal of the semi-continuous lengths of mesh-structure produced during manufacture.

The holes in the starting material may be through-holes or blind holes. If the holes are blind, the film or membrane in the hole will either rupture on stretching, or may remain as a thin membrane. Hole sizes are measured between respective tangent lines (see below).

The term "oriented" means molecularly-oriented. In general, when an oriented strand is referred to, the preferred direction of orientation is longitudinal of the strand.

"Uniax" and "biax" mean uniaxially-oriented and biaxially-oriented, respectively. Substantially uniaxially-oriented means that on the surface of the structure, there has been extension of the material in one direction but no substantial resultant extension of the material in the direction at right angles.

The terms "thick" and "thin" refer to the dimension normal to the plane Of the material or mesh structure. Unless otherwise specified, the thickness is the distance between the extreme faces at the thickest point. However, raised edges or tapered or feathered edges are ignored, as well as any minor grooves in the surface and any irrelevant projections from the surface. Where the thinning down of one part is compared to that of another part, the thinning down is the percentage thinning down (related to the original thickness) and not the absolute measure of the thinning down.

The "width" is the dimension at right angles to the major axis of the zone in question, and "narrow" relates to this dimension.

A "junction thicker zone dip" is a dip in the main direction centre line of the junction, there being on each side of the dip thicker parts on the same centre line and within the same junction.

A "tangent line" is a notional line tangent to the ends of the holes on either side of a strand-forming zone.

In extruded starting materials and in embossed or moulded starting materials, the holes are not normally vertical sided (i.e. perpendicular to the plane of the starting material). For extruded starting materials as a good approximation, the tangent line can be taken as the notional line tangent to the plan view see-through, i.e. the minimum hole size as viewed normal to the plane of the material, but ignoring film or feathered edges. For embossed or moulded starting materials, where the holes normally have sloping sides, as a good approximation, the tangent line can be taken as the notional line tangent to a point half way up the side of the hole, or, if the slope is different on each face, tangent to a point half-way between points half way up the respective slopes, films or membranes in blind holes being ignored.

The "notional junction zone" or "n.j.z." is the zone of the starting material defined between the respective pair of tangent lines parallel to the MD and the respective pair of tangent lines parallel to the TD. In the mesh structures, the notional junction zones are the zones of the surfaces of the structure which have been formed from the notional junction zones of the starting material.

"Strictly uniplanar" means that the material or structure is symmetrical about a median plane parallel to its faces. In general, a uniplanar starting material will give a uniplanar structure when stretched.

A "strictly flat" starting material has monoplanar, parallel faces.

The "starting material" is the material immediately before initiation of the first stretch.

"Punch-out" is the ratio of the maximum dimension of the holes (i.e. between the respective tangent lines) in a specified direction to the pitch of the holes in the same direction, whether or not the holes have been formed by punching or by another procedure which may not even involve material removal.

An "overall stretch ratio" is the stretch ratio applied to the whole length of the material. A "resultant stretch ratio" is the stretch ratio in the final product, after any contraction that may have occurred. A "resultant area stretch ratio" is the product of the overall resultant stretch ratios in the MD and TD. All stretch ratios given for the notional junction zone or junction are as measured on the surface in the MD, normally on the junction centre line. Where the stretch ratio (or orientation) is stated for a specific point, it will have been determined over a finite length or zone centred on the point. All resultant stretch ratios are as measured after relaxation or after annealing if annealing is carried out.

"Erosion" is the progression of substantial orientation from a zone that is already substantially oriented into a zone that is not oriented or not substantially oriented, normally indicated by an abrupt increase in thickness.

"PP" is polypropylene, "PE" is polyethylene, "HDPE" is high density polyethylene, and "PET" is polyethylene terapthalate (polyester).

The term "soil" includes rocks, stones, gravel, sand, earth, clay or aggregate held by a binder such as asphalt.

The "strength" of a mesh structure is the maximum MD strength per unit width, as measured in a normal tensile test, for instance in kN per meter width.

The "economy rating" is the MD strength of the product per unit width per mass per unit area, measured as kN per m per kg per $m^2$ in the MD.

"Truth lines" are parallel lines applied (normally by printing or drawing) to the starting material, normally in two directions parallel to the MD and TD respectively.

The "45° point" is a point on a line passing through the centre of the junction at 45° to the MD.

THE INVENTION

After twelve years of commercial production of mesh structures of said type by methods of said type, a procedure has been discovered which significantly increases the MD stretch ratio without introducing unacceptable crackiness or a marked dip in the centre part of the junction.

The tensile properties per unit width of mesh structure can be considerably improved. Economy ratings of 255 and 316 $kN/m/kg/m^2$ can be achieved with HDPE and PP respectively. The mesh structures, when produced in a continuous manufacturing process, can be very uniform throughout (except perhaps at the edges) with very similar junction forms and very similar junction stretch ratios. The mesh structures can have high creep resistance because of the high degree of orientation in the junctions and the more uniform orientation both within the individual junctions and throughout the structure, giving very good stress transmission paths.

The invention enables the TD punch-out to be reduced to as low as about 20%, 25% or 30% without significant danger of splitting in manufacture or significant crackiness in the finished mesh structure. The TD punch-out and the reduction in width of the n.j.z. both affect the width of the final product. Lower TD punch-out gives greater MD strength per unit width. However wider but lower strength materials can be produced by having greater TD punch-out and also by applying less MD stretch (and therefore less TD contraction). In general, wider products can be obtained with suitable hole sizes and pitching and suitable TD stretch ratios.

In general, resultant overall MD stretch ratios of more than about 5:1 or 6:1, and resultant area stretch ratios of more than about 5:1, 8:1 or 10:1, can be obtained. The resultant stretch ratios at the mid or thinnest points of the main (ie MD) strands can be more than about 7:1, 8:1, 9:1 or 11:1. Using HDPE, it is possible to achieve resultant MD overall stretch ratios of about 7:1 or more, and resultant MD stretch ratios of about 6:1, 8:1, 10:1 or more at the mid-points of the main strands and about 3.5:1 or 4.5:1 or more on the surface of the centre of the junction. Using PP, it is possible to achieve resultant MD overall stretch ratios of about 3.5:1 or 8:1 or more. Using PET, it is possible to achieve resultant MD overall stretch ratios of about 3.5:1 or more with resins currently available. Polyolefins, e.g. HDPE or PP, stretch to ratios two or three times the PET stretch ratios. In general, the resultant MD stretch ratio may be at least about twice that in the TD and at least about 2.5, 3, 4 or 5 times for polyolefins; if the TD pitch is less in the final product than in the starting material, the resultant area stretch ratio will be less than the resultant MD stretch ratio.

STRETCHING BEHAVIOUR

During at least that part of the MD stretch in which the n.j.z.'s are substantially extended, substantial contraction is ensured in the TD, and the main strand-forming zones thin down to a substantial or high degree before the n.j.z.'s begin to thin down, and the thinning down of the main strands reaches or passes into the ends of the n.j.z.'s .

The TD stretch orients the transverse strand-forming zones and the wider zones at or adjacent the ends of the transverse strand-forming zones whilst having little or no effect on the n.j.z.'s. In the MD stretch or stretches, the main strand-forming zones can be drawn to a considerable extent before the n.j.z. starts to extend, i.e. a substantially greater stretching force or time is required to extend the n.j.z. than the main strand-forming zones, and then either the ends of the n.j.z. begin to extend or the whole n.j.z. extends as an entity—the n.j.z. and particularly its central part does not substantially neck down to form a substantial dip, i.e. the n.j.z. does not yield significantly from its centre. The main strands may have stretched out fully before the n.j.z. extends significantly or the stretch in the main strands may continue during or after stretching the n.j.z.

As stretching is continued, the whole of the n.j.z. is oriented and there is a relatively large extension of the n.j.z. As substantial TD contraction is ensured, the whole of the n.j.z. will always be substantially narrower in the biax product than in the starting material. The width reduction may be at least about 30, 40 or 50%. In effect, the substantial narrowing of the n.j.z. indicates that there has been a substantial increase in length of the n.j.z. and uniaxial orientation of the junction central or thicker zone, consequent in part on the substantial TD contraction.

A central or thicker zone which is formed at each junction corresponds generally to the n.j.z., particularly as regards the MD ends. The sides of the central or thicker zone may include some material which was originally in the ends of the transverse strand-forming zones.

PROFILE AND ORIENTATION OF JUNCTIONS

The central or thicker zone, or the n.j.z., in the product preferably has no part substantially wider than its end portions, and more preferably has generally parallel sides in the MD, though a slight narrowing, bulging, or cupid's bow is not excluded. A section through the final junction along the central axis parallel to the MD and normal to the structure is significantly different from that along the axis parallel to the TD. The junction centre may have thinned down more than the transverse strand mid-points.

The central or thicker zone is substantially oriented substantially uniaxially in the MD. This provides continuous, substantially uniaxial orientation in the MD from end to end of the mesh structure, and the main strands and said central or thicker zones form parallel ribs running right through the mesh structure. With a strictly flat starting material, the centres of the junctions have not thinned down substantially more, i.e. are not substantially more oriented, than any other part of the n.j.z. on the MD centre line. In more general terms, there is no substantial dip in the central or thicker zone. Preferably the junction centre has thinned down least, i.e. is the least oriented part (and will be the thickest part of the junction if the starting material was strictly flat), but it could in some circumstances thin down slightly more, i.e. be slightly more oriented, than one or both ends or end portions of the n.j.z.. There is a relatively uniform degree of orientation throughout the length of the n.j.z. along the MD centre line. Thus the stretch ratio at one or both ends or end portions of the n.j.z. is preferably not more than about 100%, 60% or 50% greater than that at the centre and preferably not more than about 40% or 20% greater (e.g. if the stretch ratio at the centre is 5:1, a stretch ratio at the ends of 6:1 is 20% greater). The reduction in thickness at one or both ends or end portions (expressed as a percentage) is preferably no more than about twice or 1.75 times that at the centre, or up to about 2.5 times for PP. At least on the surface, there may be a progressive increase or substantially no increase in the MD stretch ratio from the centre of the n.j.z. to the ends or end portions of the n.j.z. (as considered in the MD), and even a progressive increase to the centres of the main strands, and there may be no abrupt change in the rate of increase. The n.j.z. or junction extends a significant distance into what was traditionally called the strand. The central or thicker zone may be at least about twice or 2.5 times as long as it is wide. The central or thicker zone may have reentrants at each end, in that more plastics material has been eroded from the centres of the ends than from the sides of the ends. The reentrants may be extensive, each extending for over about one third of the length of the thicker zone so that the thicker zone has a generally H shape.

THE BIAX ZONES

The MD stretch puts substantial MD orientation into the zones at or adjacent the ends of the transverse strand-forming zones, which have already been substantially oriented in the TD, thereby forming substantially biaxial orientation in such zones—in this way, the TD stretch affects the orientation behaviour of the structure during the latter part of the MD stretch; such zones are on either side of the central or thicker zone and on the axes or centre lines of the respective transverse strands, and can be relatively small. Such biax zones give high resistance to cracking when flexing in the TD. These zones are wholly or mainly outside the n.j.z., at least on the surface, and are between the ends of the transverse strands and the junction central or thicker zone, though they are drawn towards the junction during the final stretch in the MD. Normally the biax zones will be thinner than the junction central zone. Thinner biax zones can give more flexibility transverse to the MD and increase resistance to cracking.

There may be a reduction in thickness when progressing along a transverse strand centre line into the respective biax zone; there is no marked thickening at least until the thicker or central zone is reached.

Oriented crotches are formed between edges of main strands and of respective transverse strands. In general, the material of the crotches has not come from the n.j.z. and thus the crotches do not form part of the junction proper. The crotches may have a thickness of the same order as, or roughly the same as, the transverse strand thickness; for a good approximation, the thickness of the crotches can be measured inwards of any tapering or feather edge or raised edge, but more accurately, as the crotches will be uniaxially oriented, X-ray diffraction tests can be performed and the thickest part of the uniaxially oriented zone adjacent the edge can be taken as the crotch thickness measurement; if the crotches are of differing thickness, the thinner crotch is measured. The crotches will normally be substantially thinner than the junction central zone. The biax zone can at its thinnest point, or at the thinnest point along the axis of the respective transverse strand, be thinner than the 45° points of the crotches around the respective zone, but substantial dips or thin parts should be avoided, the thickness of the biax zone being not less than about 40%, 50% or 60% or 70% of the thickness of the (thinner) crotch 45° point. If a biax zone is too thin, the thin part can be split and act as a tear starter; once a tear has started, it may propagate along the respective strands and cause the structure to split apart. The absence of tear starters is important regarding resistance to tensile stress both in the MD and in the TD. Once the structure has been say embedded in soil, resistance to MD stress is the most important requirement, but the structure will be subjected to TD stress both during manufacture and when being handled and also as the soil is consolidated. Furthermore, a biax zone can be caused to split by granular material when consolidating soil. The crotches merge gradually with the biax zones, as seen in section normal to the plane of the structure along a line passing through the centre of the junction at 45° to the MD; in other words there is no marked change in gradient and there is a smooth transition as one passes from a crotch into the biax zone, the rate of change of thickness not changing rapidly; visually, the crotches are not in the form of filaments markedly differentiated from the biax zones.

TD STRETCH

The stretch in the TD should not be so great that while stretching in the MD, the unoriented or only slightly oriented n.j.z. is not strong enough to resist significant yielding in its centre part before its end parts extend. The maximum amount of orientation which can be applied during the TD stretch is that which ensures that less oriented material (i.e. material less oriented than that in the remainder of the transverse strands) still remains at the ends of the transverse strand-forming zones and adjacent the n.j.z., and ensures that the n.j.z. does not yield significantly in the TD though some erosion can occur where the n.j.z. meets the transverse strand-forming zones. This avoids substantial necking down of the n.j.z. and the formation of a substantial dip in the centre part of the n.j.z. during the final stretch. Nonetheless, the amount of stretch in the TD must be sufficient to allow said biax zones to form; i.e. at the end of the stretching operation in the TD, oriented material must be present adjacent though not necessarily at the ends of the transverse strands, such oriented material being oriented in the TD. The biax zones formed during the final stretch comprise said less oriented material. If a two-stage procedure is being carried out (see below), the maximum amount of orientation which can be applied during the first stretch is that which in the second or final stretch still allows substantial orientation or thinning down of the main strand-forming zones before the n.j.z. extends, though some erosion can occur where the n.j.z. meets the main strand-forming zones; in general terms, the maximum orientation is that amount which ensures that the cross-sectional area in the region of the junction in the plane of the TD is stronger than the cross-sectional area of the main strand-forming zones at their yield points.

When stretching in the TD, the orientation can go beyond the tangent line, but not too strongly. The stretch in the TD can be such that the orientation just penetrates right through the n.j.z. from one transverse strand-forming zone to that on the other side of the n.j.z., Or such that the penetration is greater than 25% of the width of the n.j.z., on each side on the surface of the mesh structure. However, it is not necessary to go beyond the tangent line or even to within a distance of the tangent line equal to about 10%, 25% or 40% of the thickness of the material at the tangent line (or about 5%, 10% or 20% of the width of the n.j.z.). The overall stretch in the TD can be up to about 2.5:1, 3:1, 4:1 or 5:1, or more.

MD STRETCH

The main strands can be stretched substantially or to a high degree (e.g. the mid-points or thinnest points of the main strands can thin down by at least about 50% or 60%) before the n.j.z.'s begin to stretch substantially.

The n.j.z. Or junction, as measured from end to end, is stretched to a ratio of at least about 2.5:1 in general; for PET about 2.5:1 may be the maximum; for polyolefins such as PP and PE (and more particularly HDPE), and in general, the n.j.z. or junotion can be stretched to a ratio of at least about 3.5:1, 4:1 or 4.5:1, and can be stretched to a ratio of at least about 5:1 or 5.5:1. One or both ends or end portions of the n.j.z.'s, or of the junction central or thicker zone, are preferably stretched to a ratio of at least about 4:1 or 5:1. The junction or n.j.z. centre can have a lower degree of orientation (about 3:1 to about 5:1 or more) than the strand mid-points. The thickest part, e.g. the centre with a strictly flat starting material, of the n.j.z. or junction reduces in thickness by more than about 30%, and thickness reductions can be from about 40% up to about 50% or 60% or more. The stretch ratio at the mid-points of the main strands is frequently not more than about 233% or 150% or 100% greater than the stretch ratio at the notional junction centre, particularly for PE (and more particularly HDPE) or PET. If the starting material is strictly flat, the ratio of the thickness of the thickest point of the junction to the thickness of the mid-point of the main strands can be not more than about 2.5:1 or 2:1. The ratio of the thickness of the thickest point of the junction to the thickness of the mid-point of the transverse strands can be not more than about 5:1, 4:1, 3:1, 2.5:1 or 2:1, but the ratio can be as low as for instance nearly 1:1 or lower, ie the transverse strand mid-point could be thicker than the thickest point of the junction; with profiled starting materials, the ratio could be considerably higher, e.g. 10:1 or 8:1 or 6:1.

The stretch in the MD, at least when applying substantial stretch to the n.j.z., will have just the natural restraint of the equipment, permitting a contraction in the TD of for instance up to about 20, 25, 30, 40 or 50% or more; however, there is a relationship between the draw length and the width—if the draw length is too short in relation to the width, some anomalous junctions may be produced in the central region of the structure due to insufficient contraction. During the contraction, material is pulled towards the junctions from material which was originally at the ends Of the transverse strand-forming zones as the n.j.z.'s lengthen in the MD. This also has the effect of reducing the resultant overall stretch ratio in the TD, and the TD pitch may even be less in the final product than in the starting material, i.e. there may be a resultant contraction in the TD.

STRETCHING PROCEDURE

In general, the final stretch will be a MD stretch although a small final, second TD stretch could be applied.

TWO-STAGE PROCEDURE

In a simple procedure, the starting material is given a first stretch in the TD, followed by a second stretch in the MD.

THREE-STAGE PROCEDURE

In a preferred procedure, the starting material is given a first stretch in the MD, followed by a second stretch in the TD and a third stretch in the MD (termed a three-stage procedure herein). If this is done, less power is required in the stretcher used for the TD stretch as the material is lighter when it reaches this stretcher; furthermore, the stretch ratio applied in the third (MD) stretch can be lower, say 1.2:1, 2:1, 2.5:1 1 or 3:1 overall, and high production speeds can be maintained whilst keeping the rates of strain within acceptable limits. The maximum orientation which can be applied during the first, MD stretch is that which still allows the transverse strand-forming zones to yield and orient in the second or TD stretch without significantly yielding the n.j.z., though some erosion can occur where the n.j.z. meets the transverse strand-forming zones.

In general terms, the maximum orientation is that amount which leaves the MD cross-sectional area of oriented or lesser oriented material in the re9ion of the junction still stronger than the minimum cross-sectional area of the transverse strand-forming zones. The degree of stretch should not be such that the third, MD stretch cannot be carried out in the manner described or such that the product of the invention cannot be obtained. It is desirable that during the first, MD stretch there should be no substantial extension of all parts of the n.j.z., but there can be some penetration of orientation into the middle of the n.j.z. Preferably the first, MD stretch is such that the thinning down or orientation does not proceed substantially beyond the respective tangent line. However, the main strands may have thinned or oriented in the first, MD stretch to such an extent that in the final, MD stretch, the n.j.z.'s extend before any further thinning or orientation of the main strands, and no further thinning or orientation of the main strands need occur.

MANUFACTURING PRACTICE

In normal manufacturing practice, the mesh structure is formed as a long MD length which is rolled up. It is not necessary to cool between stretches, and all or any two or any three stretching operations can be carried out in-line without cooling.

THE HOLES The holes can be formed in any suitable manner, for instance by punching, moulding or embossing or during extrusion, for instance as described in FR 2 131 842 or U.S. Pat. No. 3,252,181. It is desirable to have a hole shape which leaves material in the corners or spandrels (i.e. outside the notional junction zone) to assist in forming the biax zones and also forming good crotches around the junctions in the mesh structure and reduce any tendency of the ends of the transverse strands to split or become cracky during the final MD stretch; suitable hole shapes include barrel-shapes and quasi-elliptical. In general terms, by having the ends of the transverse strand-forming zones widening out, the zones yield during the TD stretch at a point well spaced from the ends (from the respective tangent lines), and better control of the TD orientation can be achieved; however for such control, the transverse strand-forming zones should not be too wide (MD dimension). If the width of the transverse strand-forming zones or of the end portions thereof is too great, splits may occur adjacent the ends of the transverse strands when stretching in the MD—in effect, the ends of the transverse strands are pulled apart in the MD. On the other hand, if the width of the transverse strand-forming zones is too small, the biax zones may not be formed As the junction shear test results are better with wider transverse strands, the transverse strand-forming zones may have the maximum width with which satisfactory orientation is achieved.

In the preferred starting material, all the holes are on a substantially square or rectangular notional grid. However, the invention is also applicable to starting materials having a suitable more oomplex pattern of holes in which all the holes are not on the same square or rectangular grid.

STARTING MATERIALS

The starting materials need not be strictly flat and can be for instance generally as disclosed in EP-A-0 418 104. Furthermore, the starting materials need not be substantially uniplanar. If the n.j.z.'s are thicker than the ends of the transverse strand-forming zones, or are offset from the ends of the transverse strand-forming zones (as seen in section taken in the TD), the degree or rate of thickness or offset change (e.g. with a sloping surface) must not be so great that biaxial orientation is not achieved in said biax zones—a rapid or overlarge change could so reduce the restraining effect of the end of the transverse strand as to cause predominant uniaxial orientation (in the MD) in such a zone.

The starting materials are preferably not substantially oriented, though melt flow orientation can be present. The starting material can be any suitable thermoplastics material, for instance PET, or polyolefins such as HDPE, PP and copolymers of HDPE and PP. Skins or surface layers can be applied, for instance for ultra-violet stabilization or to permit lamination.

In one preferred starting material, the main strand-forming zones and the n.j.z.'s are thicker than the transverse strand-forming zones; the starting material can have parallel ribs which comprise the main strand-forming zones and the notional junction zones; the ribs can protrude from one face or both faces of the starting material.

There is available a mesh structure in which the transverse oriented strands are each wholly or partially divided into two generally superimposed strands which may be somewhat displaced relative to each other in the MD, looking at the structure in plan, formed from a extruded starting material in which a slot is formed in the MD through the middle of the transverse strand-forming zone. The present invention could be applied to such a starting material. Structures produced in this manner are expected to have the advantages of the invention. They can be considered as having junctions, transverse strands and biax zones in accordance with the invention.

Whatever the form of the starting material, the main strand-forming zones can have narrower parts to provide yield points, for instance as described in U.S. Pat. No. 4,590,029 or in U.S. Pat. No. 4,743,486; this allows the material to be more easily stretched uniformly to a relatively low stretch ratio in the first, MD stretch of a three-stage procedure. To provide yield points in the ribbed starting material referred to above, the holes can cause the ribs to be somewhat narrower in the main strand-forming zones.

The starting materials are sufficiently thick for the mesh structures to be used as geogrids, e.g. of a thickness of not less than about 2, 2.5 or 3 mm at its thickest point or at least about 4 or 6 mm, and thicknesses of up to 10 mm or more can be employed, particularly if the three-stage procedure is used. Roughly, the maximum thickness reduction that can be expected in normal production is about 50% or 60% or more, and thus starting material thicknesses of 2, 2.5 or 3 mm will produce products whose thicknesses may be respectively about 1, 1.25 or 1.5 mm, or less. It is believed that at least for the plastics materials commonly used for making mesh structures, the behaviour of the material alters at smaller thicknesses, and that one will not necessarily achieve a structure like that of the invention using a starting material which is significantly thinner than those contemplated herein, a minimum starting material thickness of 2 mm being taken as a safe value for conventional starting materials, stretching temperatures and stretching rates.

TESTING

As the behaviour of the starting material varies with many factors such as the resin used, the thickness, the stretching temperature, the hole shapes and the hole pitches, test pieces should be made to ascertain whether the desired orientation behaviour is achieved.

Laboratory samples can be produced and tested before carrying out tests on a production line. The application of truth lines greatly assists in observing the orientation behaviour.

PREFERRED EMBODIMENTS

The invention will be further described, by way of example, with reference to the accompanying drawings, in which:

FIG. 7 is an enlargement of the mesh structure of FIG. 5, showing thicknesses in mm and stretch ratios;

FIG. 8a is an enlarged section along the centre line VIIIA—VIIIA in FIG. 7;

FIG. 8b is an enlarged section along the transverse line VIIIB—VIIIB in FIG. 7; FIG. 9 is an enlarged section along the 45° line IX—IX in FIG. 7;

Figure 25:
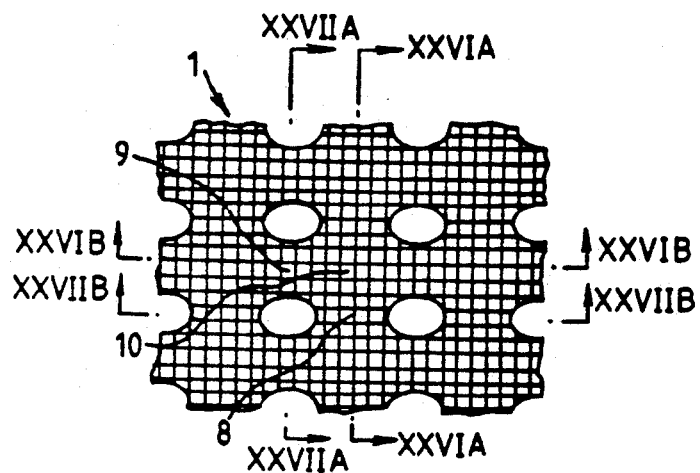
Figure 26A:
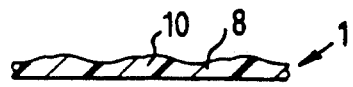
Figure 26B:
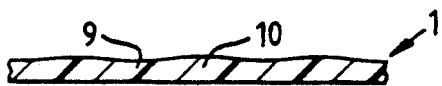
Figure 27A:
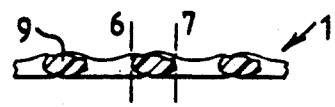
Figure 27B:
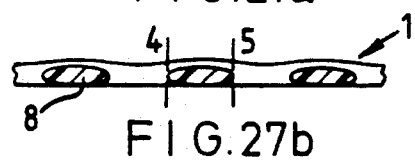
Figure 28A:
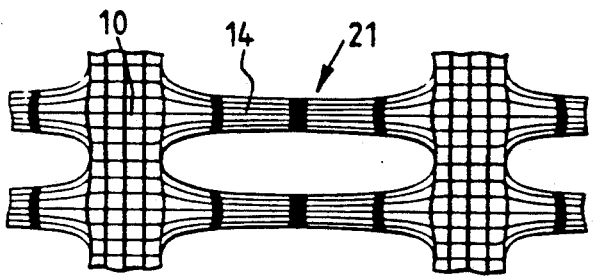
Figure 28B:
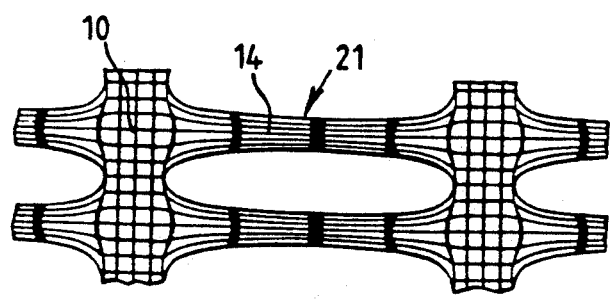
Figure 29A:
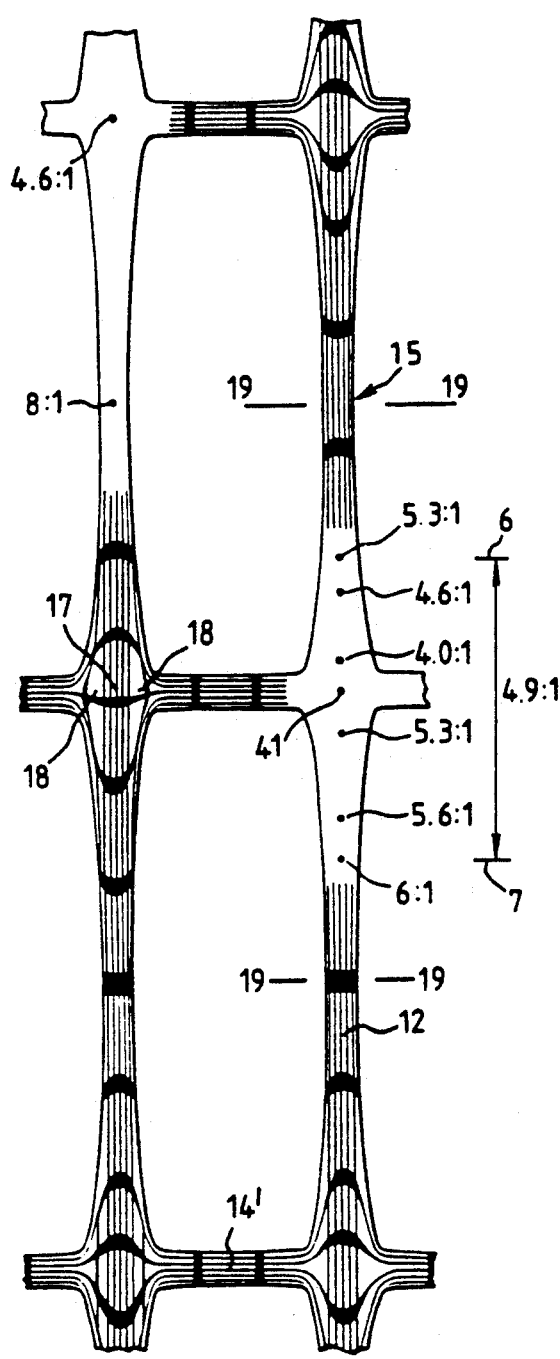
Figure 29B:
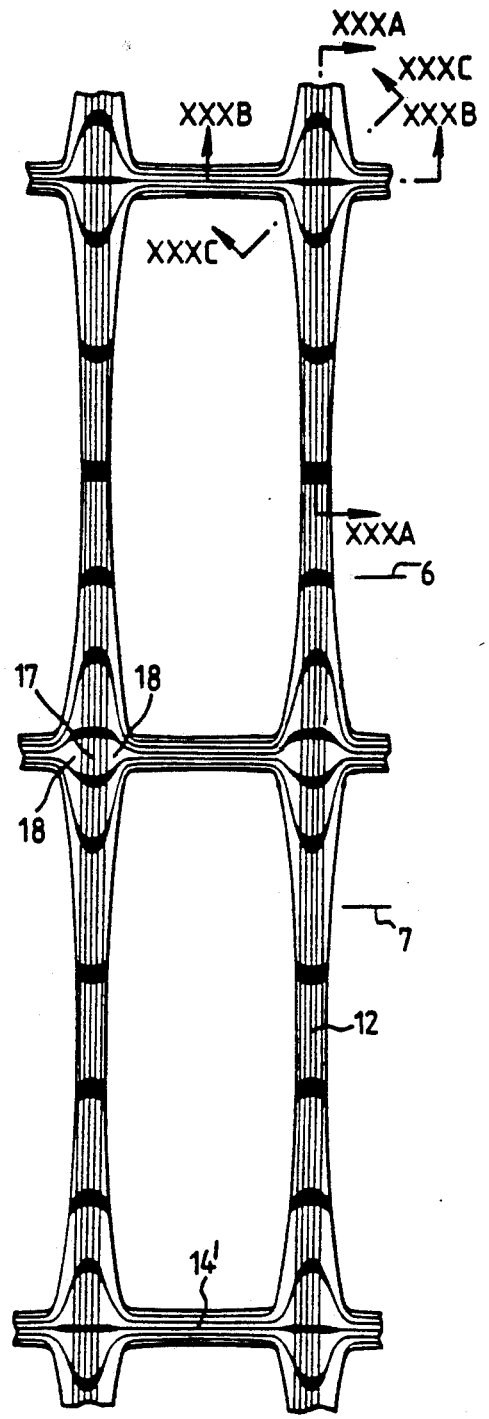

FIGS. 20 to 23 correspond to FIGS. 16 to 19, but using a fourth starting material;

FIG. 24 is a plan-view of another mesh structure;

FIG. 25 is a plan view of a fifth starting material, showing thicknesses in mm;

FIGS. 26a, 26b, 27a and 27b are sections along the lines XXVIA—XXVIA, XXVIB—XXVIB, XXVIIA—XXVIIA and XXVIIB—XXVIIB, respectively, of FIG. 25;

FIGS. 28a and 28b are plan views of the two faces of the mesh structure produced when the starting material of FIG. 25 is given a first stretch TD, in a two stage procedure;

FIGS. 29a and 29b are plan views of the two faces of the mesh structure produced when the mesh structure of FIGS. 28a and 28b is then stretched MD, FIG. 29a showing stretch ratios and FIG. 29b showing thicknesses in mm;

FIGS. 30a is an enlarged section along the centre line XXXA—XXXA in FIG. 29a, showing thicknesses in mm;

FIG. 30b and 30c are enlarged sections along the transverse and 45° lines XXXB—XXXB and XXXC—XXXC in FIG. 29a;

FIG. 31 illustrates some hole shapes that can be used and;

FIG. 32 is a vertical section through an embankment, illustrating the use of a geogrid according to this invention.

The contour hatching, when used, indicates a steep slope (increase in thickness), the hatching lines extending up the slope.

When more than one n.j.z. or junction of a stretched material is shown, in general all n.j.z.'s or junctions are shown as identical although in practice there could be small differences between the n.j.z.'s or junctions. The junctions depicted in Figures which show successive stages or enlargements are not generally the same junction and the truth lines will be in somewhat different positions; for instance FIGS. 5 and 7 can be compared.

The Table below gives representative details for the materials described in FIGS. 1 to 14 and 16 to 30c.

FIGS. 1 to 9

Figure 1:
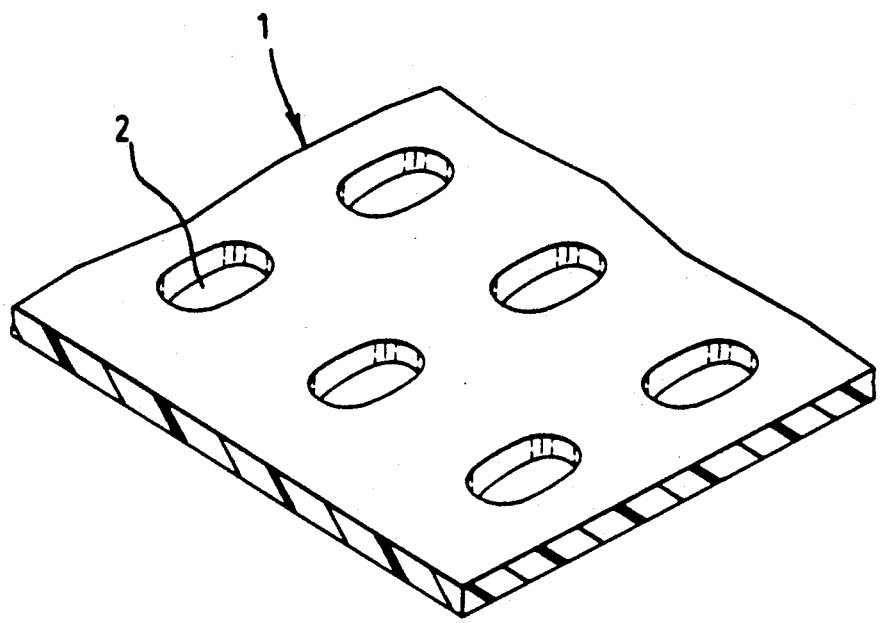
FIG. 1 is an isometric projection of a first starting material.
Figure 2:
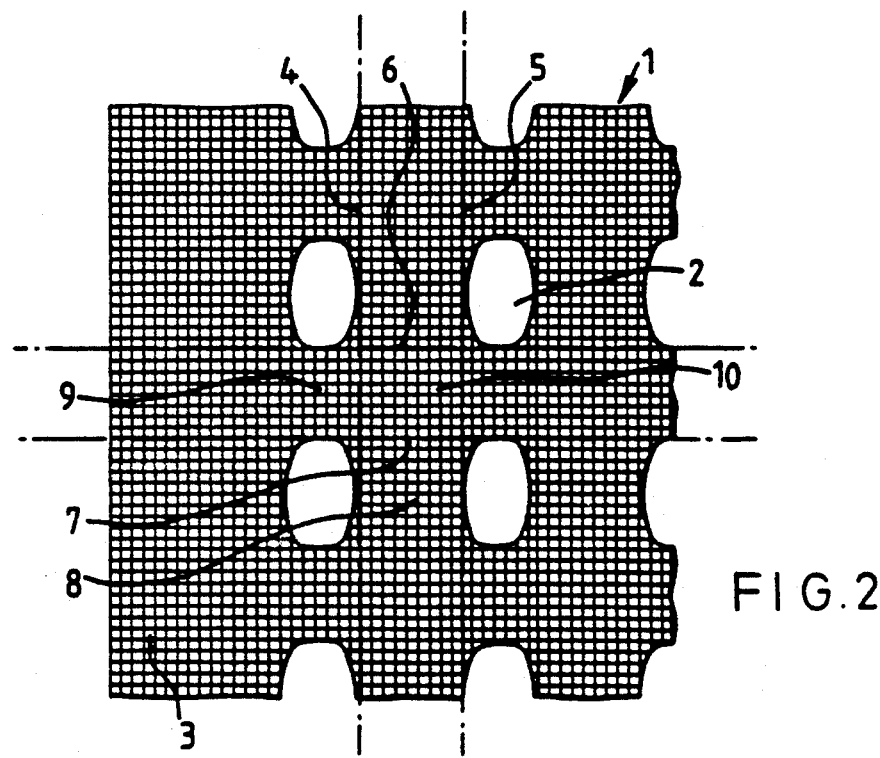
FIG. 2 is a plan view of the starting material of FIG. 1, showing truth lines.

The truth lines in FIGS. 2 to 5 indicate the progress of orientation, at least on the surface of the structure. As shown in FIGS. 1 and 2, a strictly flat starting material 1 is provided with holes 2 on a notional rectangular grid, and a selvedge 3 is shown in FIG. 2. The MD is N-S (up and down the sheet) and the TD is E-W (across the sheet). MD tangent lines 4, 5 are shown, as are TD tangent lines 6, 7. There are MD or main strand-forming zones 8 between respective adjacent holes 2 in the TD, and there are TD or transverse strand-forming zones 9 between respective adjacent holes 2 in the MD. A n.j.z. 10 is shown defined between respective pairs of tangent lines 4, 5 and 6, 7.

Figure 3:
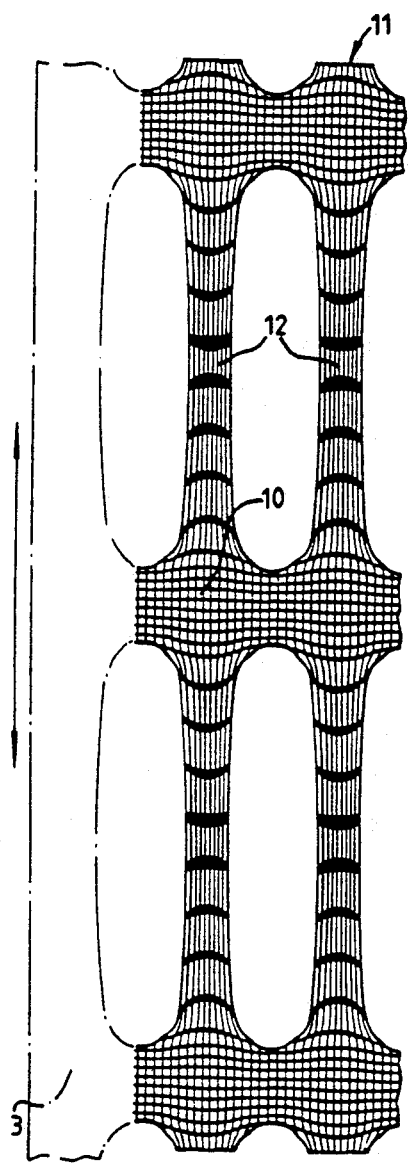
FIG. 3 is a plan view of the mesh structure formed when the starting material of FIG. 2 is given a first stretch MD, in a three-stage procedure.

As shown in FIG. 3, the starting material 1 is first stretched in the MD, forming a uniax mesh structure 11. It will be seen from the movement of the truth lines that there is penetration of orientation into the n.j.z. 10 from the MD strands 12 which have been formed, but the penetration is not very significant. On the surface, the truth lines have moved on each end of the n.j.z., and they have moved slightly in the central 40% of the length of the n.j.z. 10. The selvedge 3 has been stretched out more or less as a whole—for instance, if a 3:1 stretch overall is applied to the mesh structure, the selvedge thickness would be reduced by about 50%. There is no transverse restraint in the first MD stretch, but as there is no significant penetration of orientation across the n.j.z.'s 10, there is no significant TD contraction.

Figure 4:
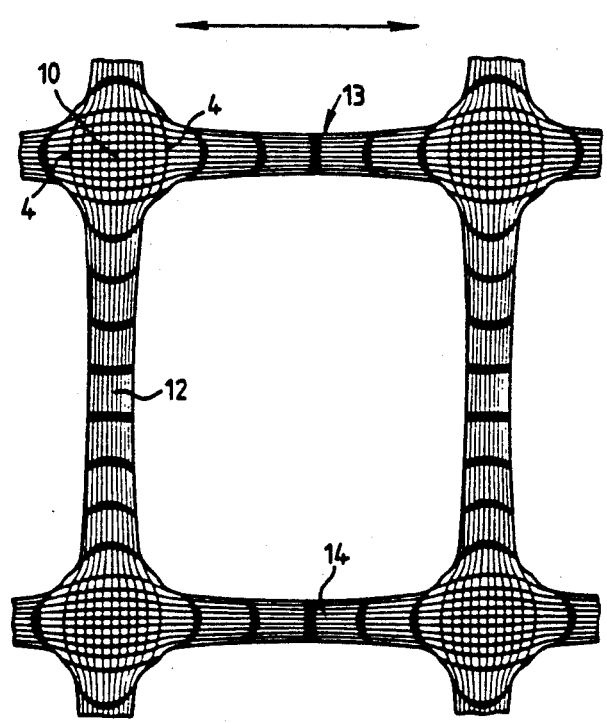
FIG. 4 is a plan view of the mesh structure formed when the mesh structure of FIG. 3 is then stretched TD.

In order to carry out the second, TD stretch, the respective selvedges 3 are held in the clips of a stenter, to form a first biax mesh structure 13. As shown in FIG. 4, the orientation of the TD or transverse strands 14 penetrates into the n.j.z.'s 10, but the penetration does not reach the centre and is not significant. On the surface, the truth lines have moved on each side of the n.j.z. 10, but they have not moved in the central 40% of the width of the n.j.z. 10.

Figure 5:
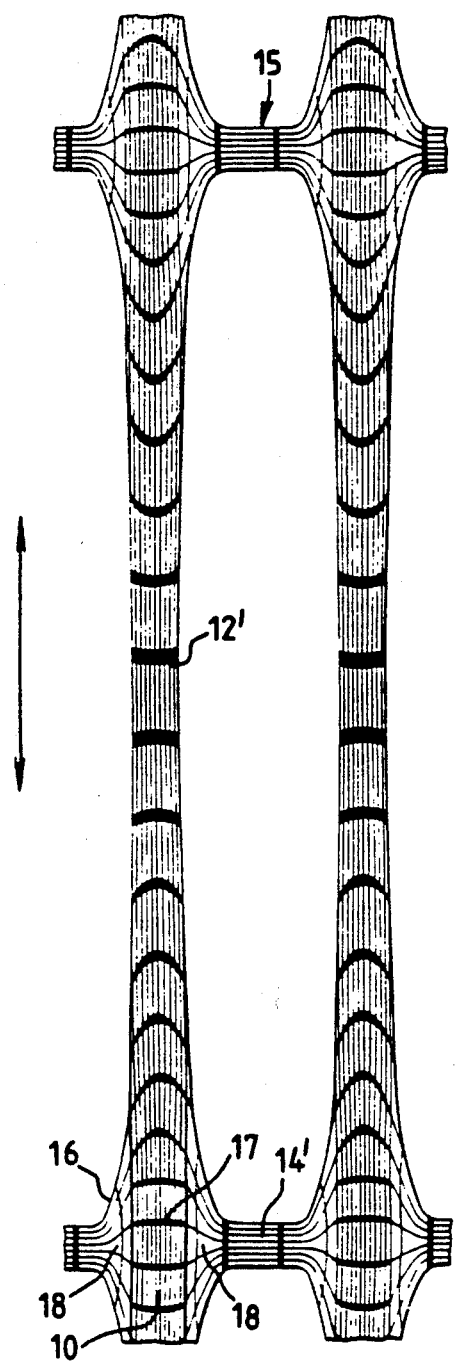
FIG. 5 is a plan view of the mesh structure formed when the mesh structure of FIG. 4 is then stretched MD.
Figure 6:
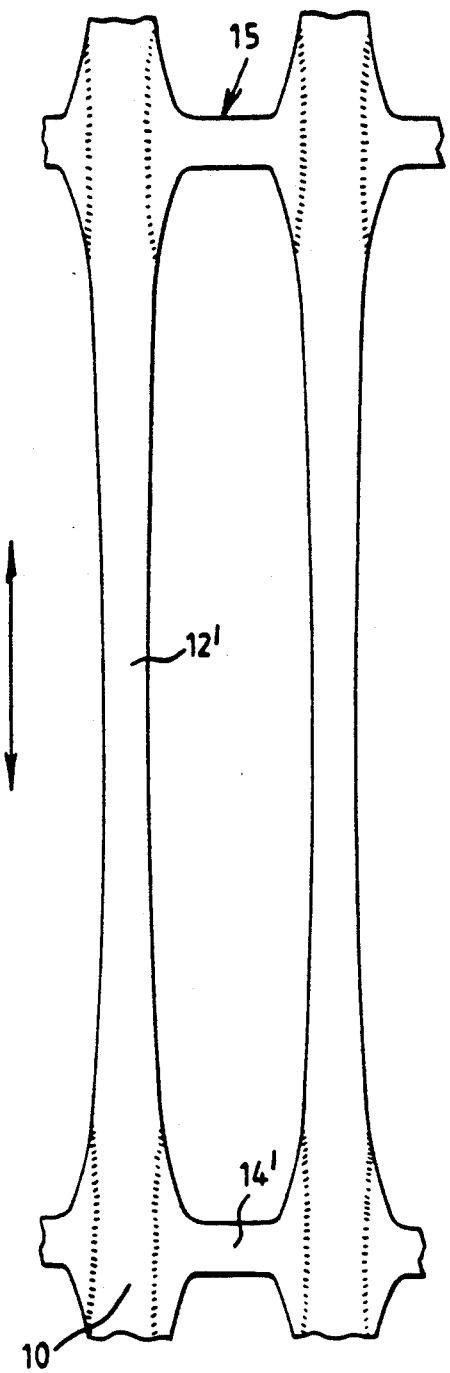
FIG. 6 is a plan view of the mesh structure of FIG. 5, but showing contour hatching.

FIG. 5 shows the final biax mesh structure 15 after a further MD stretch. There was no TD restraint, and substantial TD contraction has occurred, the TD strands 14 shortening to form shorter TD strands 14' as the MD strands 12 lengthen to form longer MD or main strands 12'. FIG. 7 gives thickness measurements as well as indicating stretch ratios in the MD, as calculated from measurement of spacing of the truth lines. The thicknesses are given in mm, mostly to one decimal place.

As can be seen observing the truth lines in FIG. 5, the TD strand-forming zones 9 have been stretched out, thinned down and oriented to form the TD oriented strands 14'. The MD strand-forming zones 8 have been stretched out, thinned down and oriented to form MD oriented strands 12' extending at right angles to the TD strands 14'. As shown in FIG. 3, the MD strands 12 oriented to a substantial degree before the n.j.z.'s 10 began to thin down. In FIG. 5, the thinning down of the MD strands 12' passed into the ends of the n.j.z.'s 10 and the stretching was continued until the thinning down extended right through the n.j.z.'s 10 to aligned MD strands 12' on the other sides of the n.j.z.'s 10. Furthermore, crotches 16 were created interconnecting the adjacent edges of respective MD and TD strands 12', 14', and the orientation passed around the crotches 16 in the direction running around the respective crotch 16. Stretching was continued until the n.j.z. 10 had increased in length in the MD by a significant ratio so that each junction was oriented.

In each junction, there is a central or thicker zone 17 (see FIG. 5), which corresponds more or less to the n.j.z. 10 and is substantially thicker than biax zones 18 on either side thereof and on the axis of the TD strands 14'. The thicker zone 17 has a substantially greater dimension parallel to the MD strands 12' than that parallel to the TD strands 14' and has generally parallel sides in the MD. As indicated by the difference between the distance between the respective tangent lines 4, 5 and 6, 7 on the starting material and on the biax mesh structure 15, the n.j.z 10 has increased in length by a ratio of 4.38:1 and the whole of the n.j.z. 10 has narrowed down or decreased in width by 51% relative to its original width. The distances were measured on the MD and TD strand centre lines or axes. The whole of the thicker zone 17 is substantially oriented substantially uniaxially parallel to the MD. This can be determined from the large movement of the TD truth lines and from the final position of the MD truth lines; any slight opening out of the TD truth lines after the TD stretch (FIG. 4) has been completely eliminated and the MD truth lines have become closer than in the starting material 1, throughout the length of the thicker zone 17. The thicker zone 17 is thicker than the mid-points of the main and transverse strands 12', 14'. The centres of the n.j.z.'s 10 have not thinned down substantially more than any other part of the n.j.z.'s 10, and may be slightly thicker than the remainder of the mesh structure 15. The biax zones 18 are thinner than the TD strands 14', are thinner than the 45° points of the crotches 16, and merge gradually with the crotches as seen in the 45° section of FIG. 9. FIG. 9 shows where the crotch 45° point thicknesses are measured. The rate of increase of thickness as one passes from the MD strand 12, to the centre of the junction is regular and not very rapid or abrupt so that the orientation of the n.j.z. 10 is relatively uniform—the slow increase in thickness can be seen from the stretch ratios given in FIG. 7 and from FIG. 8a. There is continuous uniaxial orientation in the MD from end to end of the mesh structure 15.

In FIG. 7, the MD strand mid-points are indicated by the lines 19.

Figure 10:
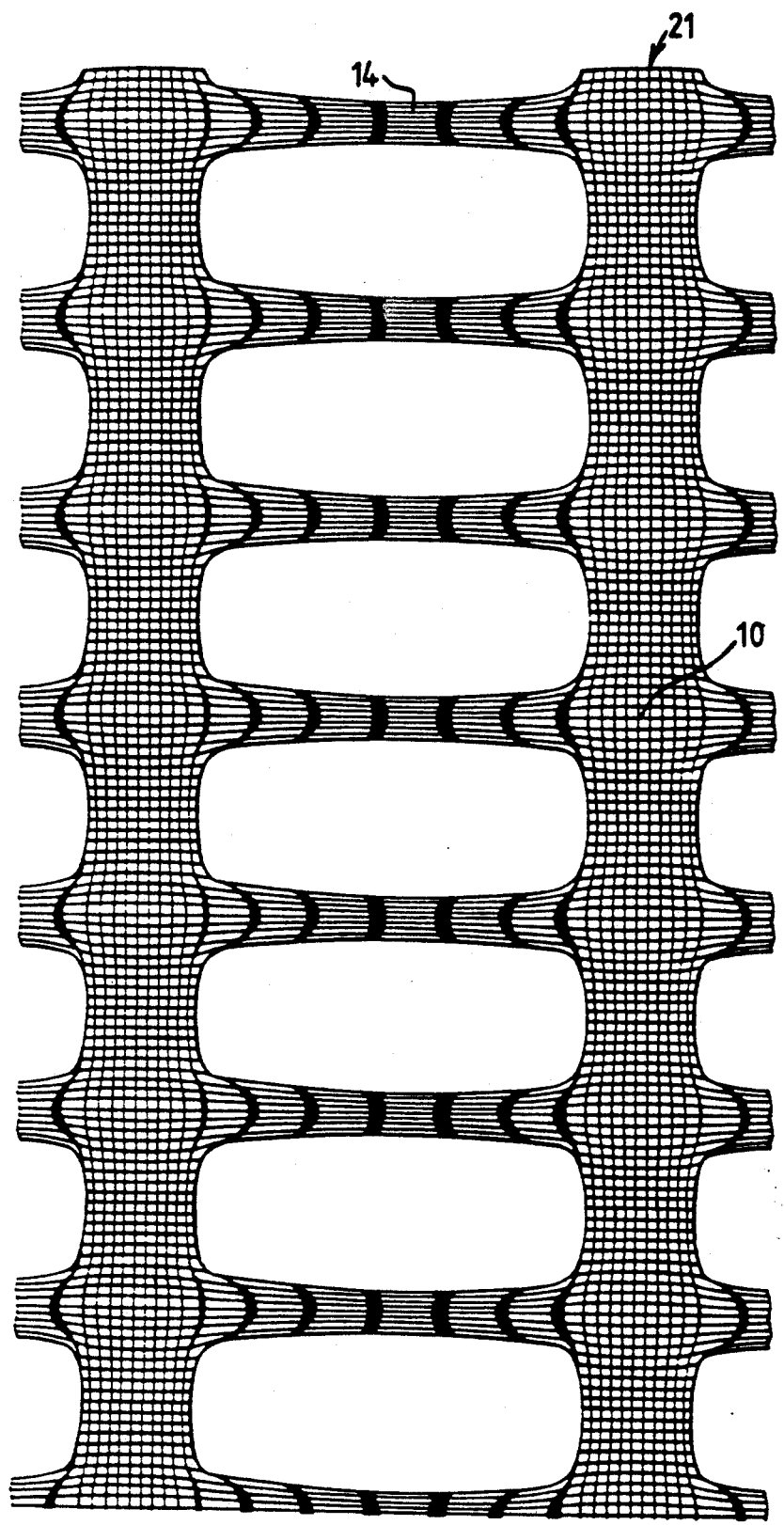
FIG. 10 is a plan view of the mesh structure formed when the starting material of FIG. 1 is given a first stretch TD, in a two-stage procedure.
Figure 11:
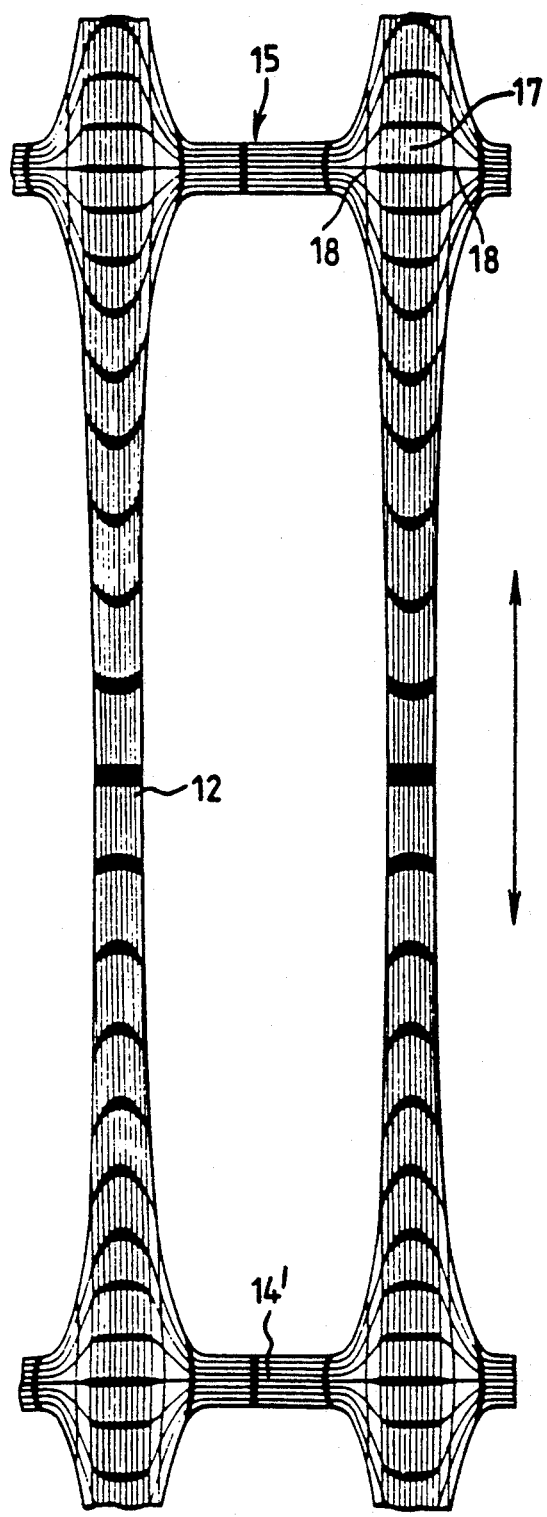
FIG. 11 is a plan view of the mesh structure formed when the starting material of FIG. 10 is then stretched MD.

FIGS. 10 and 11

FIGS. 10 and 11 show an alternative two-stage procedure using the starting material of FIGS. 1 and 2, in which there is just an initial TD stretch to form a TD oriented structure 21 followed by a final MD stretch. The junction form of the final mesh structure 15 (FIG. 11) is similar to that shown in FIGS. 5 to 9.

Figure 12:
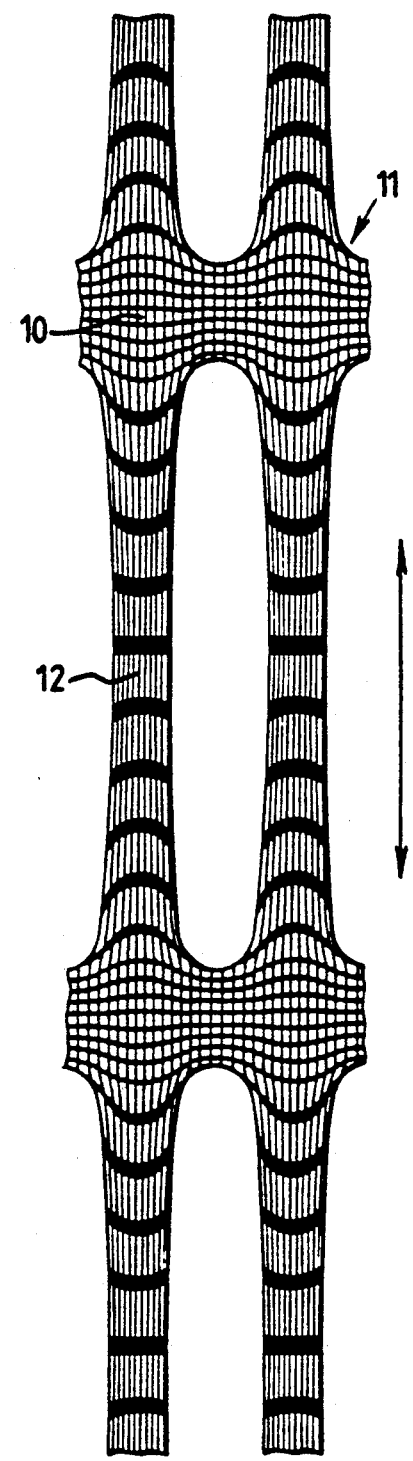
FIGS. 12 to 14 correspond to FIGS. 3 to 5, with the same starting material but different stretch ratios, according to a three-stage procedure.
Figure 13:
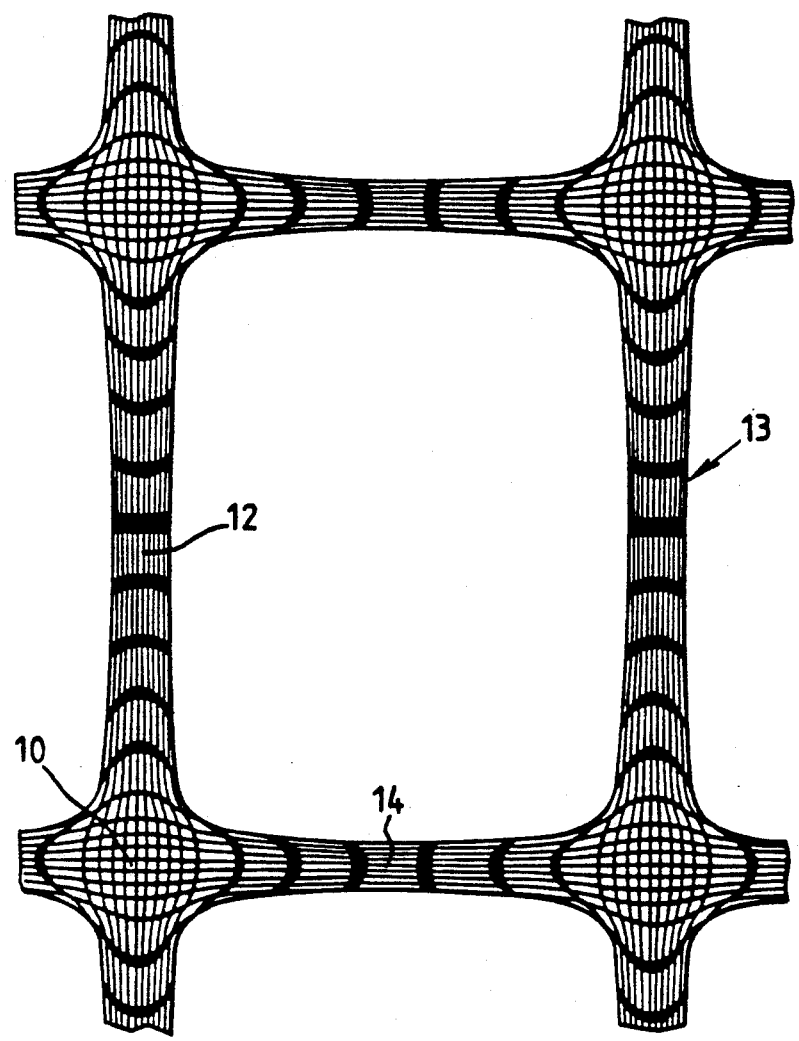
Figure 14:
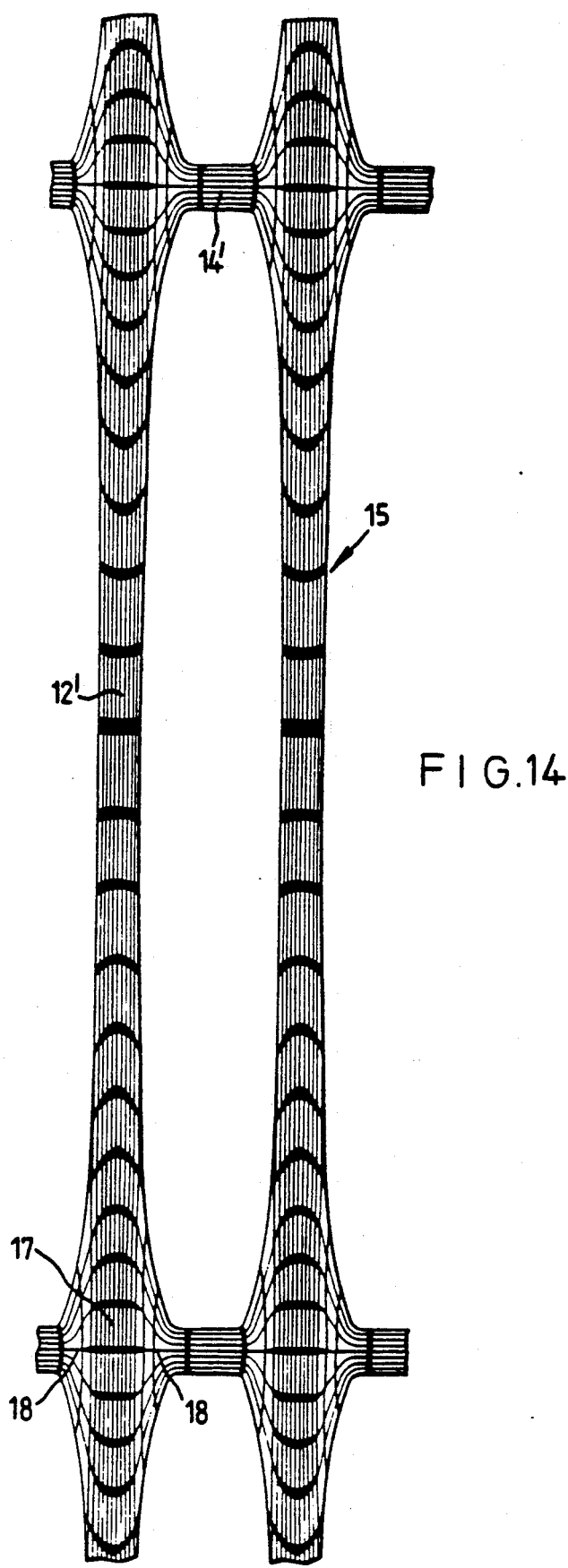

FIGS. 12 to 14

The three-stage procedure shown in FIGS. 12 to 14 corresponds to that shown in FIGS. 3 to 5, using the starting material of FIGS. 1 and 2. However, in FIG. 12, the first, MD stretch has been carried out to such an extent that the orientation has penetrated right through the n.j.z. 10, at least on the surface. In the second, TD stretch (FIG. 13), the TD orientation has penetrated to slightly more than it has in FIG. 4. The junction form of the final mesh structure 15 (FIG. 14) is similar to that shown in FIGS. 5 to 9.

FIG. 15

Figure 15:
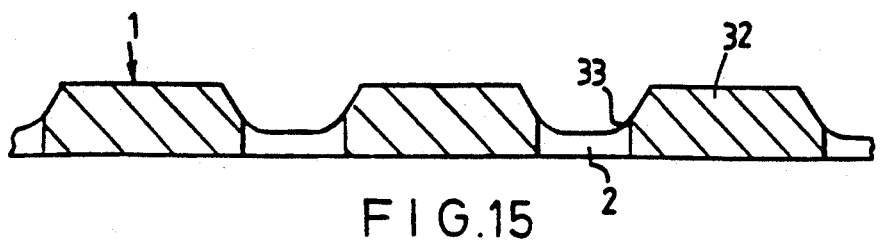
FIG. 15 is a section through a second starting material.
Figure 16:
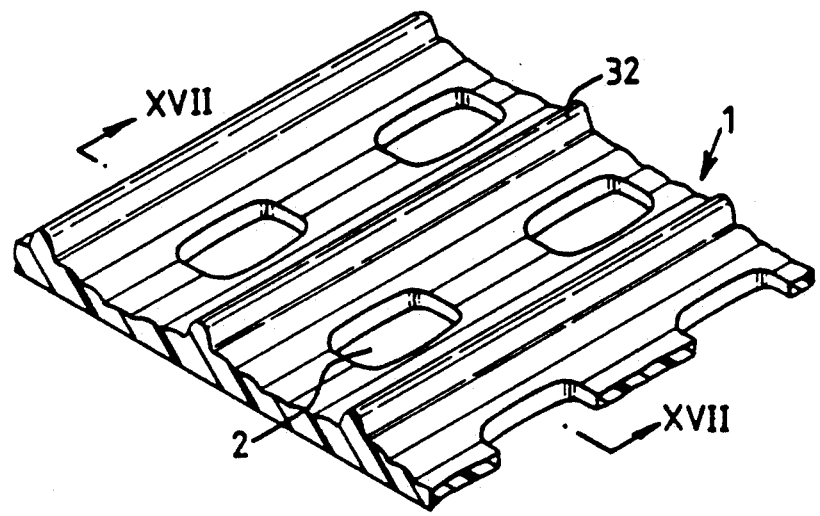
FIG. 16 is an isometric projection of a third starting material.

FIG. 15 shows a second starting material 1 which is of ribbed form on one face, providing ribs 32 with troughs 33. Holes 2 are formed in the troughs 33, and are slightly wider than the bases of the troughs 33 but do not significantly narrow down the ribs 32. The sloping between the ribs 32 and the troughs 33 is such that the biax zones 18 (see FIG. 5) can be formed with suitable biaxial orientation.

FIGS. 16 to 19

FIGS. 16 to 19 illustrate a third starting material and the finished mesh structure 15 in which the starting material 1 has ribs 32 on one face. The ribs 32 run down the centres of the strand-forming zones and n.j.z.'s, but have sloping shoulders so that the biax zones 18 (see FIG. 5) can be formed. Although the junctions have MD ribs running along their centres, the general form of the junction and the orientation of the junction are similar to those in FIGS. 5 to 9.

FIGS. 20 to 23

Figure 20:
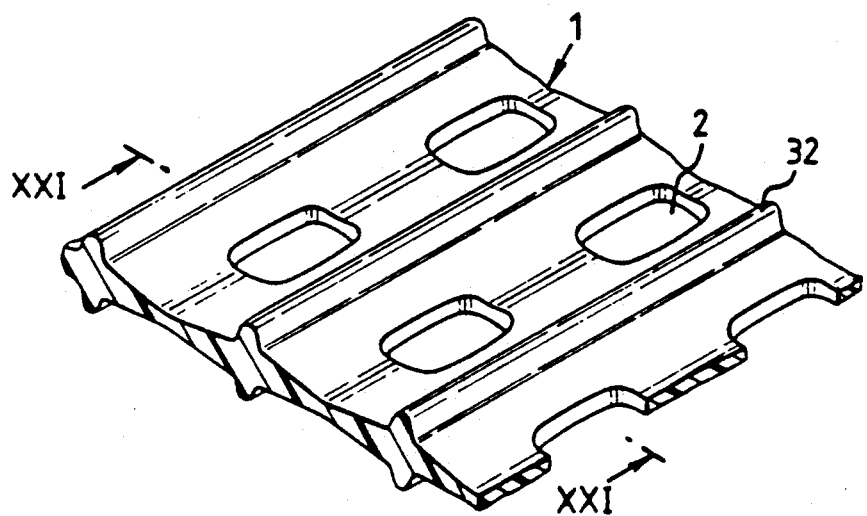
Figure 21:
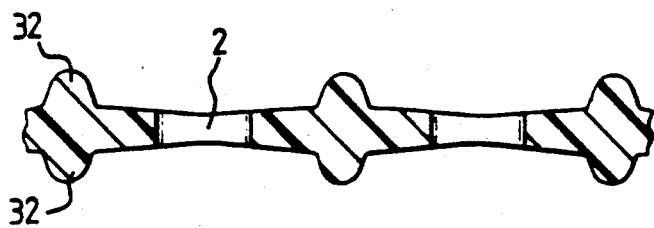
Figure 22:
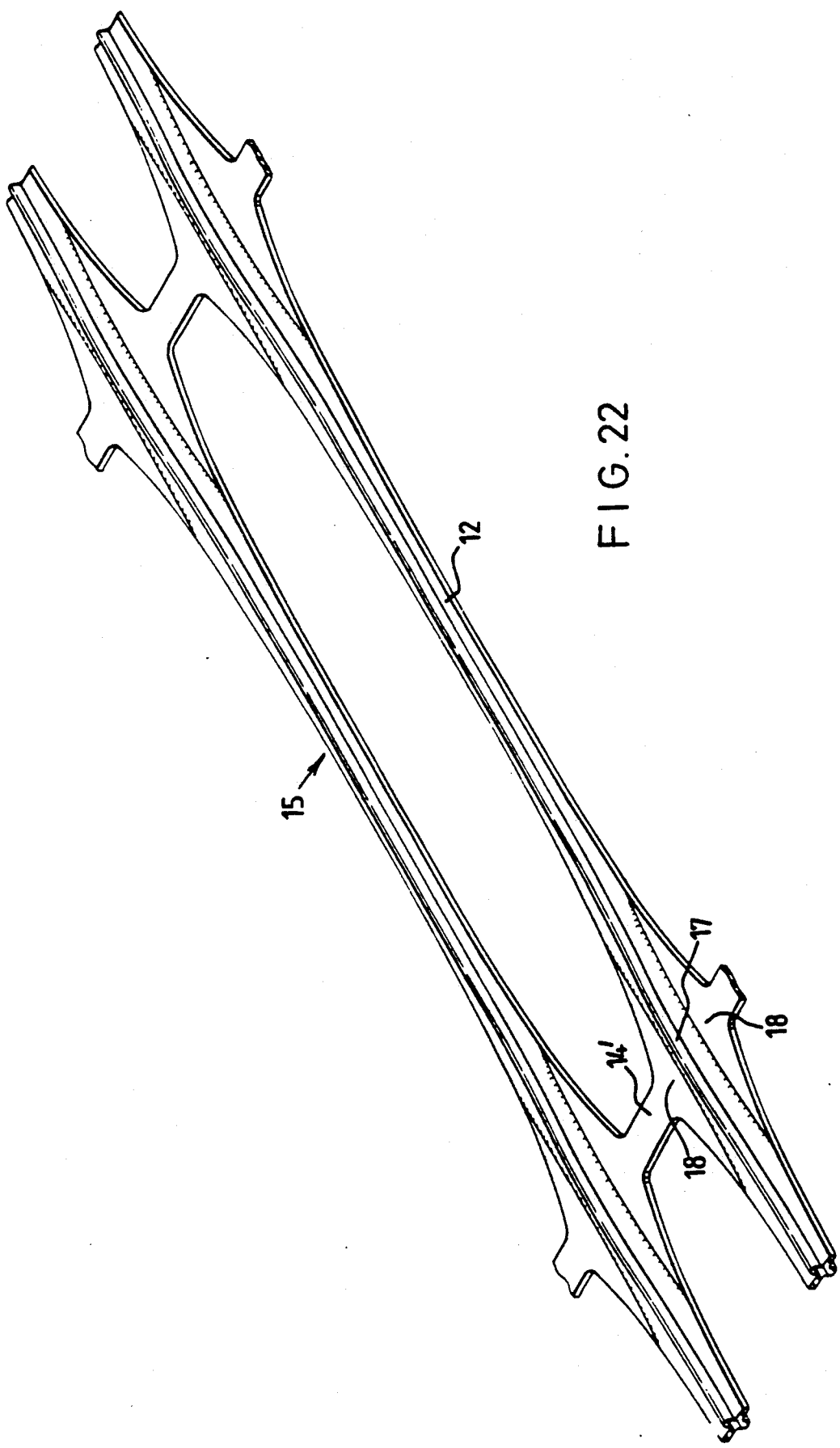

The fourth starting material 1 of FIGS. 20 and 21 is strictly uniplanar, having the ribs 32 on each face. Otherwise however the starting material is similar to that of FIGS. 16 and 17, and the final mesh structure 15 (FIGS. 22 and 23) is similar to that of FIGS. 18 and 19. Truth lines are not shown on FIG. 23, but dots are visible along the MD centre line, corresponding to equi-spaced dots on the MD centre line of the starting material 1. There is only a small variation in stretch ratio along the MD centre line of the junction.

FIG. 24

FIG. 24 illustrates the product of Example 8 in the Table below. The sides of the thicker zone 17 are not strictly parallel, and have a shape slightly like that of Cupid's bow, the ends being slightly wider than the centre.

FIGS. 25 to 30c

FIGS. 29a and 29b illustrate both faces of the product of Example 11 of the Table below. An apertured material was formed by extrusion and expanded over a mandrel to provide the starting material 1 of FIGS. 25 to 27. The starting material 1 is of non-uniform thickness and is not strictly symmetrical about the centre lines of the TD strand-forming zones 9; also, the starting material 1 has not the same profile on each face. However, the starting material 1 is substantially uniplanar. As is shown in FIGS. 28a to 29b, the stretching behaviour on each face is similar but not identical. As the thickest part of the n.j.z. 10 in FIG. 27 was displaced from the centre (mid-point) of the n.j.z. 10 in the MD, the thickest part of the junction 17 in FIG. 29 is displaced from the centre 41 in the MD, as shown in FIG. 30a. FIG. 30c shows that the biax zones 18 merge gradually with the crotches 16 around the respective biax zone 18, and shows where the crotch 45° point thicknesses are measured.

FIG. 31

FIG. 31 illustrates some preferred shapes of holes 2. The shapes of the holes 2 leave material in the corners or spandrels for the formation of the crotches 16.

EXAMPLES

A number of Examples are given in the following Table.

Figure 17:
FIG. 17 is a cross section along the line XVII—XVII in FIG. 16.
Figure 18:
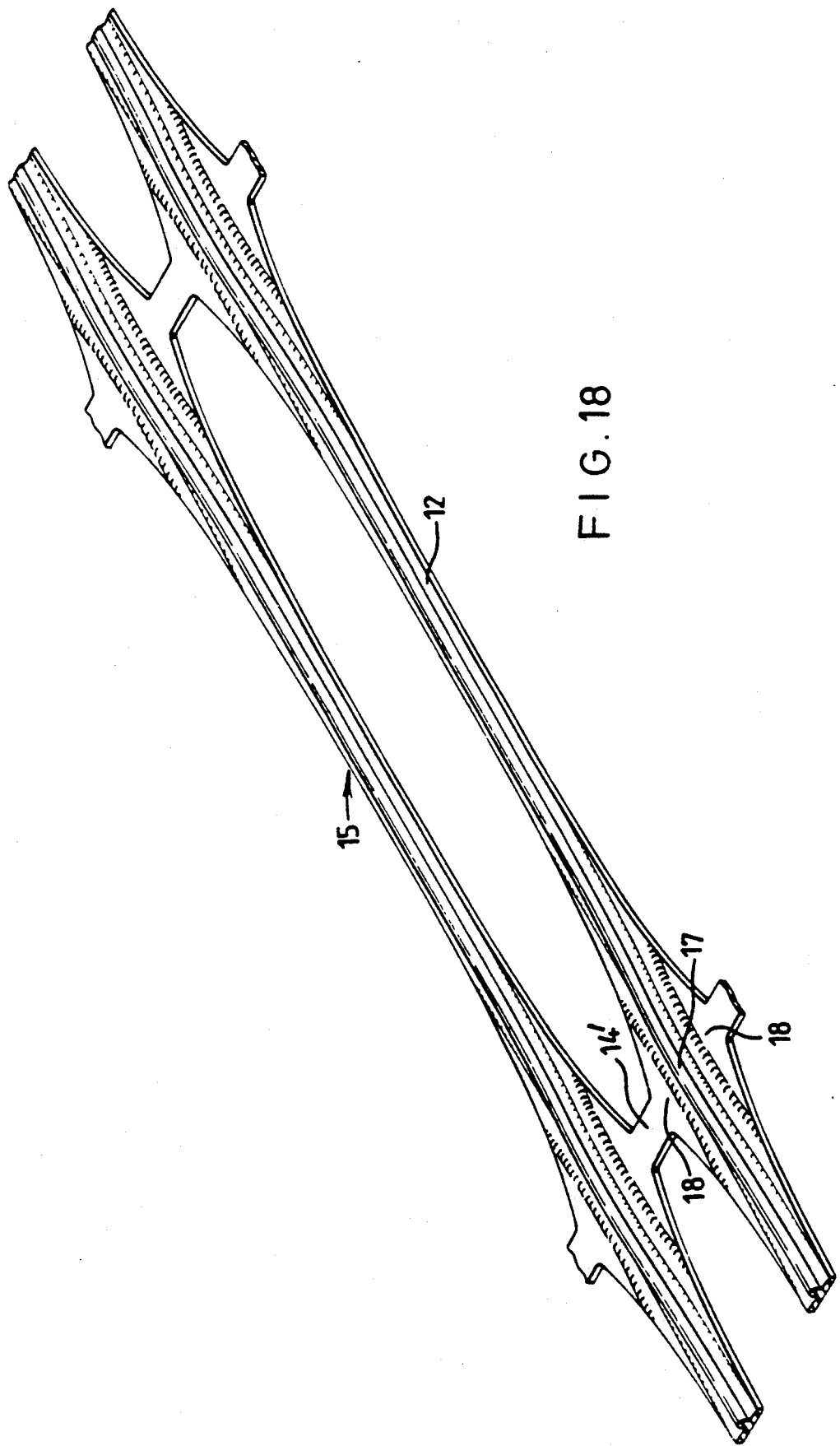
FIG. 18 is an isometric projection of the mesh structure formed when the starting material of FIG. 16 is stretched TD then MD, according to a two-stage procedure.
Figure 19:
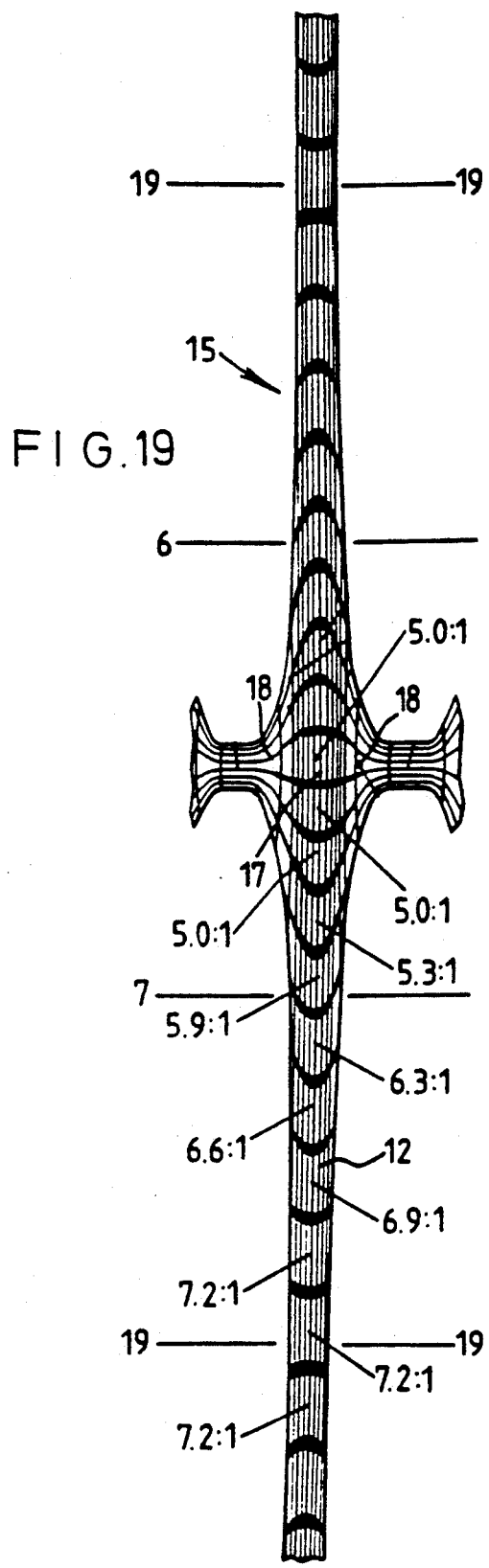
FIG. 19 is a plan view of the mesh structure of FIG. 18, showing thicknesses in mm and stretch ratios.

In Examples 1 to 3, 6 to 10 and 12, the starting materials were strictly flat; Examples 4 and 5 had starting materials as shown in FIGS. 17 and 21 respectively; Example 11 had a starting material as in FIG. 25; all the holes were formed by punching except for Example 11 where the holes were produced during extrusion. Stretch ratios are overall unless related to a particular zone.

Details of the holes are as follows:

Circular—12.7 mm diameter;
Barrel (FIG. 31, second to left of top row)—9.5 mm TD, 15.9 mm MD;
Diabolo (FIG. 31, centre of top row)—9.5 mm TD, 25.4 mm MD, 0.5 mm waisting on each side;
Ellipse—10 mm TD, 19 mm MD;
Oval (FIG. 31, right of top and bottom rows show two typical shapes, there being a variation in the shapes across the starting material)—6.4 to 6.6 mm TD, 4.4 to 4.5 mm MD.

In each of the Examples, the mesh structure product had considerably greater strength in the MD than in the TD.

"-" indicates that the relevant measurement or test was not carried out.

TABLE

| Example | 1 | 2 | 3 | 4 | 5 | 6 | 7 | 8 | 9 | 10 | 11 | 12 |
|---|---|---|---|---|---|---|---|---|---|---|---|---|
| Designation | Appendix B | Appendix C | Appendix D | Single sided PSS | Double sided PSS | Plant trial | Lab sample | Lab sample | Lab sample | Lab sample | Extruded sample | Lab sample |
| FIGS. | 1-9 | 10, 11 | 12-14 | 16-19 | 20-23 | None | None | 24 | None | None | 25-30c | None |
| Material | HDPE | HDPE | HDPE | HDPE | HDPE | HDPE | HDPE | PP | PET | HDPE | PP | HDPE |
| Thickness, mm | 4.5 | 4.5 | 4.5 | 7.5 | 10.0 | 4 | 6.0 | 6.1 | 4.5 | 6.0 | 3.3 | 6.0 |
| Hole shape | barrel | barrel | barrel | barrel | barrel | circular | diabolo | diabolo | barrel | barrel | oval | ellipse |
| TD pitch, mm | 25.4 | 25.4 | 25.4 | 25.4 | 25.4 | 25.4 | 28.6 | 28.6 | 25.4 | 40.0 | 13.5 | 40.0 |
| Bar width, mm | 12.7 | 12.7 | 12.7 | 12.7 | 12.7 | 12.7 | 12.7 | 12.7 | 12.7 | 19.0 | 6.0 | 19.0 |
| MD pitch, mm | 28.6 | 28.6 | 28.6 | 28.6 | 28.6 | 25.4 | 38.1 | 38.1 | 28.6 | 38.1 | 10.0 | 38.1 |
| TD punch-out, % | 37.5 | 37.5 | 37.5 | 37.5 | 37.5 | 50.0 | 33.3 | 33.3 | 37.5 | 25.0 | 48.0 | 25.0 |
| Stretch ratio in (first) MD stretch | 3:1 | 0 | 3.5:1 | 0 | 0 | 0 | 0 | 0 | 2.6:1 | 0 | 0 | 0 |
| Stretch ratio in TD stretch | 2.6:1 | 3.0:1 | 3.0:1 | 2.7:1 | 2.5:1 | 2.5:1 | 2.6:1 | 2.5:1 | 2.5:1 | 2.3:1 | 2.6:1 | 2.5:1 |
| Stretch ratio in (final) MD stretch | 2.0:1 | 6.0:1 | 1.9:1 | 5.9:1 | 5.9:1 | 5.8:1 | 7.0:1 | 7.5:1 | 1.4:1 | 6.1:1 | 6.0:1 | 5.7:1 |
| Resultant MD stretch ratio | 6.0:1 | 6.0:1 | 6.5:1 | 5.9:1 | 5.9:1 | 5.8:1 | 7.0:1 | 7.5:1 | 3.6:1 | 6.1:1 | 6.0:1 | 5.7:1 |
| Resultant TD stretch ratio | 1.3:1 | 1.6:1 | 1.2:1 | 1.1:1 | 1.2:1 | 1.75:1 | 1.4:1 | 1.4:1 | 1.6:1 | 0.9:1 | 1.7:1 | 1.0:1 |
| Proportion resultant MD:TD stretch ratios | 4.6 | 3.75 | 5.4 | 5.4 | 4.9 | 3.3 | 5.0 | 5.4 | 2.25 | 6.8 | 3.5 | 5.7 |
| TD contraction during (final) MD stretch, % | 52 | 46.6 | 60 | 59 | 56 | 30 | 47 | 44 | 40 | 60 | 36 | 59 |
| Resultant area stretch ratio | 7.8:1 | 9.6:1 | 7.8:1 | 6.5:1 | 7.0:1 | 10.2:1 | 9.7:1 | 10.4:1 | 5.7:1 | 5.6:1 | 10.0:1 | 5.7:1 |
| Main strand mid-point thickness, mm | 1.35 | — | — | 2.9 | — | 1.0 | 2.2 | 1.8 | 1.95 | — | 0.7 | — |
| Subsidiary strand mid-point thickness, mm | 1.4 | — | — | 1.0 | — | 2.0 | 1.6 | 1.15 | 1.5 | — | 1.3 | — |
| Increase in length of n.j.z. surface, ratio | 4.9:1 | 5.0:1 | 5.5:1 | 5.3:1 | 5.4:1 | — | 5.5:1 | 4.7:1 | 3.0:1 | 5.0:1 | 4.9:1 | 5.0:1 |
| Resultant reduction in width of n.j.z., % | — | — | — | 53 | 46 | — | — | 53 | 37 | 44 | 58 | 46 |
| Thickness junction centre, mm | 2.5 | 2.6 | 2.2 | 3.9 | 4.4 | 2.8 | 3.2 | 4.0 | 2.7 | 3.0 | 2.2 | 3.0 |
| Reduction in junction | 44 | 42 | 51 | 48 | 56 | 30 | 47 | 34 | 40 | 50 | 33 | 50 |

TABLE-continued

| Example | 1 | 2 | 3 | 4 | 5 | 6 | 7 | 8 | 9 | 10 | 11 | 12 |
|---|---|---|---|---|---|---|---|---|---|---|---|---|
| centre thickness, % | | | | | | | | | | | | |
| Thickness ends of n.j.z., mm | 1.45 | 1.4 | 1.43 | 3.0 | 3.9 | — | 2.2 | 1.4 | 2.1 | 2.1 | 1.1 / 0.7 | 2.4 |
| Reduction in thickness n.j.z. ends, % | 68 | 69 | 68 | 60 | 61 | — | 63 | 77 | 53 | 65 | ( 66 / 79 | 60 |
| Ratio % reductions n.j.z. centre: ends | 1:1.55 | 1:1.6 | 1:1.3 | 1:1.25 | 1:1.1 | — | 1:1.3 | 1:2.3 | 1:1.3 | 1:1.3 | ( 1:2.0 / 1:2.4 | 1:1.2 |
| Stretch ratio junction centre, surface | 4.0:1 | 4.0:1 | 5.0:1 | 5.0:1 | 5.0:1 | — | 5.0:1 | 3.8:1 | 2.8:1 | 4.3:1 | 4.6:1 | 4.3:1 |
| Stretch ratio n.j.z. ends, surface | 6.0:1 | 6.2:1 | 6.3:1 | 5.9:1 | 5.6:1 | — | 6.3:1 | 6.9:1 | 3.4:1 | 5.6:1 | ( 5.3:1 / 6.0:1 | 6.2:1 |
| Increase in stretch ratio n.j.z. ends: centre, % | 50 | 55 | 26 | 18 | 12 | — | 26 | 82 | 21 | 30 | 28 | 44 |
| Stretch ratio MD strand centre | 7.0:1 | 7.2:1 | 7.8:1 | 7.2:1 | 6.2:1 | 9.6:1 | 8.7:1 | 10.6:1 | 5.0:1 | 6.2:1 | 7.0:1 | 6.5:1 |
| Increase in stretch ratio main strand mid-point: n.j.z. centre, % | 75 | 80 | 56 | 44 | 24 | — | 74 | 179 | 78 | 44 | 52 | 51 |
| Thickness 45° point crotch, mm | 1.65 | 1.6 | 1.6 | 1.4 | 1.15 | 1.6 | 2.2 | 2.3 | 1.8 | 2.2 | ( 0.8 / 0.9 / 1.1 / 1.1 | 1.8 |
| Thickness thinnest point biax zone, mm | 1.3 | 1.15 | 1.3 | 0.9 | 0.7 | 1.25 | 1.6 | 1.1 | 1.4 | 1.5 | ( 1.15 / 1.15 | 1.4 |
| Thinnest point biax zone: crotch 45° point, % | 79 | 72 | 81 | 64 | 61 | 78 | 73 | 48 | 78 | 67 | ( 144 / 128 / 105 / 105 | 78 |
| Product weight, kg/m² | 0.438 | 0.377 | 0.466 | 0.565 | 0.507 | — | 0.488 | 0.439 | 0.817 | 0.905 | 0.203 | 0.852 |
| MD strength, kN/m | 71 | 63 | 79 | 88 | 83 | — | 125 | 139 | 71 | 143 | 42 | 156 |
| Economy rating, kN/m/kg/m² | 162 | 167 | 177 | 156 | 163 | — | 256 | 316 | 87 | 158 | 206 | 183 |

THE PLANT

The plant illustrated in FIG. 11 of U.S. Pat. No. 4,374,798 can be used for the two-stage procedure. The plant illustrated in FIG. 11a of U.S. Pat. No. 4,374,798 can be used for the three-stage procedure if it is followed by a second MD stretcher. The draw length of the final MD stretch for a structure 4 m wide at the beginning of stretching, can be 5, 10 or 15 m or more.

USES

The mesh structures of the invention can be used for many different purposes, particularly where high tensile strength is required in the MD. However, the principle use is as geogrids in strengthened or reinforced soil applications such as vertical walls, steep slopes and embankment foundations, forming a composite civil engineering structure having a mass of particulate material and reinforcing provided by the geogrids. FIG. 36 of EP-0 418 104 A and the description thereof give suitable examples of earth strengthening or reinforcing applications; the uniax geogrid illustrated can be replaced by a geogrid in accordance with the present invention. In general terms, the flexible, integral geogrids are suitably positioned; for instance in reinforced soil behind a vertical wall or a steep slope, the main strands will be generally at right angles to the wall or slope, as seen in plan. The mesh openings have a dimension in a direction parallel to the main strands which is several multiples of the width of the main strands at their mid-points. In the engineering structure, the geogrids are embedded in the mass of particulate material with portions of the mass below a respective geogrid, portions of the mass above a respective geogrid, and portions of the mass within the mesh openings and interlocking with the mesh openings. In this way, portions of the mass are in direct contact with the upper and lower faces of the geogrids and with the edges of the mesh openings: The geogrids have good slip resistance (interlock) properties with respect to the particulate material and provide good stress transmission paths. Furthermore, the main strands and the junctions in combination have MD tensile deformation properties which allow the particulate material limited deformation under load so that both the particulate material and the geogrids significantly contribute to the overall strength of the engineering structure.

FIG. 32 illustrates the use of geogrids 115 in accordance with the invention to reinforce an embankment 121. Many different arrangements are possible. The geogrids 115 can be connected to individual facing panels 122 by casting short geogrids 123 into the facing panels 122 and connecting the short geogrids 123 to the geogrids 115 as described in EP 0 418 104 A2 (as illustrated); alternatively, other connecting means can be used; or the geogrids can be used without connection to the facing or with no facing, or could be wrapped around the facing and then taken back into the soil as in FIG. 14 of U.S. Pat. No. 4,374,798.

The disclosures of the patent specifications referred to above are included in this disclosure by reference. The present invention has been described above purely by way of example, and modifications can be made within the spirit of the invention.

We claim:

1. A method of producing an integral, biaxially-molecularly-oriented plastics material mesh structure which extends longitudinally in a machine direction and defines a transverse direction transverse to the machine direction, comprising:

providing a plastics starting material with a thickness of not less than about 2 mm at its thickest point, and having a pattern of holes on a notional, substantially square or rectangular grid defining main, machine-direction strand-forming zones and transverse strand-forming zones between respective adjacent holes, and notional junction zones between the strand-forming zones;

stretching the material in the transverse direction to stretch out, thin down and orient said transverse strand-forming zones to form transverse oriented strands; and stretching the material in the machine direction to stretch out, thin down and orient said main, machine-direction strand-forming zones to form main, machine direction oriented strands extending generally at right angles to the transverse strands, the respective main strand-forming zones thinning down to a substantial degree before the notional junction zone begins to thin down and the thinning down of the main strand-forming zones reaching the ends of the notional junction zone, the stretching being continued without any substantial dips being formed in the notional junction zone until the thinning down extends right through the notional junction zone to the aligned main strand at the other end of the notional junction zone and so that the stretch ratio at the end portions of the notional junction zone is not more than about 100% greater than the stretch ratio at the centre of the notional junction zone, until the thinning down extends around crotches to respective transverse strands so that in the crotches the orientation is in the direction running around the respective crotch, until the thickest part of the notional junction zone has reduced in thickness by more than about 30%, and until the notional junction zone has increased in length in the main direction by a ratio of at least about 2.5:1, the whole of the notional junction zone narrowing down substantially, thereby forming an oriented junction and continuously oriented crotches connecting respective main and transverse strands, there being a central zone at each junction which is substantially oriented substantially uniaxially in the machine direction to provide continuous substantially uniaxial orientation in the machine direction from end to end of the mesh structure, and forming substantially biaxial orientation in zones on either side of said central zone and at or adjacent ends of the respective transverse strand-forming zones, the resultant machine direction stretch being substantially greater than the resultant transverse direction stretch, at least that part of the machine direction stretch in which the notional junction zones are substantially extended being subsequent to the transverse direction stretch so that the transverse direction stretch affects the orientation behavior of the structure during said part of the machine direction stretch, and substantial contraction in the transverse direction occurring during said part of the machine direction stretch.

2. The method of claim 1, wherein the material is stretched in the machine direction until the notional junction zone has increased in length in the machine direction by a ratio of at least about 3.5:1.

3. The method of claim 1, wherein the maximum transverse direction dimension of said holes is about 30% or less of the transverse direction pitch of the holes.

4. The method of claim 1, wherein said transverse direction stretch is preceded by stretching the material in the machine direction.

5. The method of claim 1, wherein said part of the machine direction stretch is the last stretch applied to the material.

6. The method of any of claim 1, wherein the stretching is carried out as a two-stage procedure, namely a transverse direction stretch followed by a machine direction stretch.

7. The method of claim 1, wherein the stretching is carried out as a three-stage procedure, namely a machine direction stretch followed by a transverse direction stretch followed by a machine direction stretch.

8. The method of claim 1, wherein the whole of the notional junction zone narrows down by at least about 30% relative to its original width.

9. The method of claim 1, wherein at the end of the machine direction stretching, the stretch ratio at the end portions of the notional junction zone is not more than about 50% greater than the stretch ratio at the centre of the notional junction zone.

10. The method of claim 1, wherein at the end of the machine direction stretching, the stretch ratio at the end portions of the notional junction zone is not more than about 40% greater than the stretch ratio at the centre of the notional junction zone.

11. The method of claim 1, wherein at the end of the machine direction stretching, the machine direction stretch ratio at the end portions of the notional junction zone is not more than about 20% greater than the machine direction stretch ratio at the centre of the notional junction zone.

12. The method of claim 1, wherein the machine direction stretch ratio at the mid-points of the main strands is not more than about 100% greater than the machine direction stretch ratio at the centres of the notional junction zones.

13. The method of claim 1, wherein during the transverse direction stretch the orientation penetrates beyond the respective machine direction tangent lines.

14. The method of claim 1, wherein in the mesh structure produced, no part of the notional junction zone has a substantially greater transverse direction dimension than the end portions of the notional junction zone.

15. An integral, biaxially-molecularly-oriented plastics material mesh structure and defining a machine direction extending longitudinally of the mesh structure and a transverse direction extending transversely of the mesh structure, the mesh structure having a thickness of not less than about 1 mm at its thickest point, and having substantially greater strength in the machine direction than in the transverse direction, the mesh structure comprising:

main oriented strands extending in the machine direction;

transverse oriented strands extending in the transverse direction; and oriented junctions between respective main and transverse strands, the thickest part of the junction having reduced in thickness by at least about 30% during stretching, respective main and transverse strands being interconnected by continuously oriented crotches with the orientation in the direction running around the respective crotches, there being a thicker zone at each junction which is substantially thicker than biaxially-oriented zones on either side thereof each on the axis of a respective transverse strand, each biaxially-oriented zone merging gradually with the crotches around the biaxially-oriented zone, as seen in section normal to the plane of the mesh structure and along a line passing through the centre of the junction at 45° to the machine direction, which thicker zone has a substantially greater dimension parallel to the machine direction than that parallel to the transverse direction, which thicker zone has been substantially oriented substantially uniaxially in the machine direction, which thicker zone defines no substantial dip, and the machine direction stretch ratio applied to the end portions of the junction not being more than about 100% greater than that applied to the centre of the junction, thereby providing continuous substantially uniaxial orientation in the machine direction from end to end of the mesh structure.

16. An integral, biaxially-molecularly-oriented plastics material mesh structure and defining a machine direction extending longitudinally of the mesh structure and a transverse direction extending transversely of the mesh structure, the mesh structure having a thickness of not less than about 1 mm at its thickest point, and having substantially greater strength in the machine direction than in the transverse direction, the mesh structure comprising:

main oriented strands extending in the machine direction;

transverse oriented strands extending in the transverse direction; and oriented junctions between respective main and transverse strands, the thickest part of the junction having reduced in thickness by at least about 30% during stretching, respective main and transverse strands being interconnected by continuously oriented crotches with the orientation in the direction running around the respective crotches, there being a thicker zone at each junction which is substantially thicker than biaxially-oriented zones on either side thereof each on the axis of a respective transverse strand, which thicker zone has a substantially greater dimension parallel to the machine direction than that parallel to the transverse direction, which thicker zone has been substantially oriented substantially uniaxially in the machine direction, which thicker zone defines no substantial dip, the thickness of the thinnest point of each said biaxially-oriented zone not being less than about 40% of the thickness of the 45° point of a said crotch around the biaxially-oriented zone, and the machine direction stretch ratio applied to the end portions of the junction not being more than about 100% greater than that applied to the centre of the junction, thereby providing continuous substantially uniaxial orientation in the machine direction from end to end of the mesh structure.

17. An integral, biaxially-molecularly-oriented plastics material mesh structure and defining a machine direction extending longitudinally of the mesh structure and a transverse direction extending transversely of the mesh structure, the mesh structure having a thickness of not less than about 1 mm at its thickest point, and having substantially greater strength in the machine direction than in the transverse direction, the mesh structure comprising:

main oriented strands extending in the machine direction;

transverse oriented strands extending in the transverse direction; and oriented junctions between respective main and transverse strands, the thickest part of the junction having reduced in thickness by at least about 30% during stretching, respective main and transverse strands being interconnected by continuously oriented crotches with the orientation in the direction running around the respective crotches, there being a thicker zone at each junction which is substantially thicker than biaxially-oriented zones on either side thereof each on the axis of a respective transverse strand, which thicker zone has a substantially greater dimension parallel to the machine direction than that parallel to the transverse direction, which thicker zone has been substantially oriented substantially uniaxially in the machine direction, which thicker zone defines no substantial dip, the thickness of the 45° points of the crotches around a respective said biaxially-oriented zone being different and the thickness of the thinnest point of each said biaxially-oriented zone not being less than about 40% of the thickness of the thinner 45° point of the crotches around the respective biaxially-oriented zone, and the machine direction stretch ratio applied to the end portions of the junction not being more than about 100% greater than that applied to the centre of the junction, thereby providing continuous substantially uniaxial orientation in the machine direction from end to end of the mesh structure.

18. The mesh structure of claim 15, wherein said junction thicker zone has a dimension parallel to the machine direction which is at least twice that parallel to the transverse direction 19. The mesh structure of claim 16, wherein said junction thicker zone has a dimension parallel to the machine direction which is at least twice that parallel to the transverse direction.

20. The mesh structure of claim 17, wherein said junction thicker zone has a dimension parallel to the machine direction which is at least twice that parallel to the transverse direction.

21. The mesh structure of claim 15, wherein the junction thicker zone has increased in length in the machine direction by a ratio of at least about 3.5:1 during stretching.

22. The mesh structure of claim 16, wherein the junction thicker zone has increased in length in the machine direction by a ratio of at least about 3.5:1 during stretching.

23. The mesh structure of claim 17, wherein the junction thicker zone has increased in length in the machine direction by a ratio of at least about 3.5:1 during stretching.

24. The mesh structure of claim 15, wherein no part of said junction thicker zone is substantially wider than the end portions of the said thicker zone.

25. The mesh structure of claim 16, wherein no part of said junction thicker zone is substantially wider than the end portions of the said thicker zone.

26. The mesh structure of claim 17, wherein no part of said junction thicker zone is substantially wider than the end portions of the said thicker zone.

27. The mesh structure produced by the method of claim 1.

28. A method of strengthening soil, comprising embedding in the soil the mesh structure of claim 15.

29. A method of strengthening soil, comprising embedding in the soil the mesh structure of claim 16.

30. A method of strengthening soil, comprising embedding in the soil the mesh structure of claim 17.

31. A method of strengthening soil, comprising embedding in the soil the mesh structure of claim 27.

32. A composite civil engineering structure, comprising a mass of particulate material strengthened by embedding therein the mesh structure of claim 15.

33. A composite civil engineering structure, comprising a mass of particulate material strengthened by embedding therein the mesh structure of claim 16.

34. A composite civil engineering structure, comprising a mass of particulate material strengthened by embedding therein the mesh structure of claim 17.

35. A composite civil engineering structure, comprising a mass of particulate material strengthened by embedding therein the mesh structure of claim 27.

* * * * *

UNITED STATES PATENT AND TRADEMARK OFFICE
CERTIFICATE OF CORRECTION

PATENT NO. : 5,269,631

DATED : December 14, 1993

INVENTOR(S) : Frank B. MERCER et al.

It is certified that error appears in the above-identified patent and that said Letters Patent is hereby corrected as shown below:

At column 9, line 59, after "formed" insert --. (period)--;

line 68, change "oomplex" to read --complex--; and please change the format of lines 32 through 68 to read;

-- THE HOLES

The holes can be formed in any suitable manner, for instance by punching, moulding or embossing or during extrusion, for instance as described in FR 2 131 842 or U.S. Pat. No. 3,252,181. It is desirable to have a hole shape which leaves material in the corners or spandrels (i.e. outside the notional junction zone) to assist in forming the biax zones and also forming good crotches around the junctions in the mesh structure and reduce any tendency of the ends of the transverse strands to split or become cracky during the final MD stretch; suitable hole shapes include barrel-shapes and quasi-elliptical. In general terms, by having the ends of the transverse strand-forming zones widening out, the zones yield during the TD stretch at a point well spaced from the ends (from the respective tangent lines), and better control of the TD orientation can be achieved; however for such control, the transverse strand-forming zones should not be too wide (MD dimension). If the width of the transverse stand-forming zones or of the end portions thereof is too great, splits may occur adjacent the ends of the transverse strands

UNITED STATES PATENT AND TRADEMARK OFFICE
CERTIFICATE OF CORRECTION

PATENT NO. : 5,269,631

DATED : December 14, 1993

INVENTOR(S) : Frank B. MERCER et al.

It is certified that error appears in the above-identified patent and that said Letters Patent is hereby corrected as shown below:

when stretching the MD—in effect, the ends of the transverse strands are pulled apart in the MD. On the other hand, if the width of the transverse strand-forming zones is too small, the biax zones may not be formed. As the junction shear test results are better with wider transverse strands, the transverse strand-forming zones may have the maximum width with which satisfactory orientation is achieved.

In the preferred staring material, all the holes are on a substantially square or rectangular notional grid. However, the invention is also applicable to staring materials having a suitable more complex pattern of--.

Signed and Sealed this

Seventh Day of March, 1995

BRUCE LEHMAN

*Attest:*

*Attesting Officer*   *Commissioner of Patents and Trademarks*

UNITED STATES PATENT AND TRADEMARK OFFICE
CERTIFICATE OF CORRECTION

PATENT NO.   : 5,269,631
DATED        : December 14, 1993
INVENTOR(S)  : Frank B. Mercer et al It is certified that error appears in the above-indentified patent and that said Letters Patent is hereby corrected as shown below:

In the drawings, Figure 29b should be deleted to be substituted with the corrected Figure 29b, as shown on the attached page.

Signed and Sealed this

Thirtieth Day of May, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,269,631                                        Page 2 of 2
DATED      : December 14, 1993
INVENTOR(S): Frank B. MERCER et al.

It is certified that error appears in the above-identified patent and that said Letters Patent is hereby corrected as shown below:

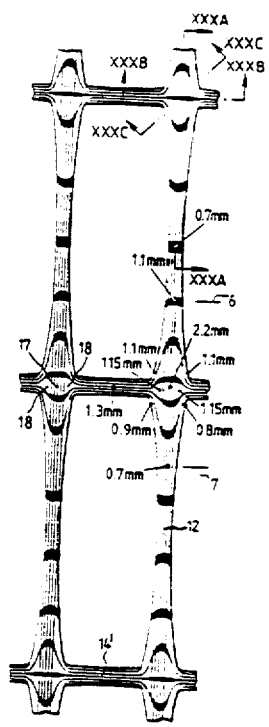

FIG.29b